United States Patent
Khomenko et al.

(10) Patent No.: US 8,452,273 B1
(45) Date of Patent: May 28, 2013

(54) SYSTEMS AND METHODS FOR DETERMINING MOBILE THING MOTION ACTIVITY (MTMA) USING ACCELEROMETER OF WIRELESS COMMUNICATION DEVICE

(71) Applicants: Maria Khomenko, Pefferlaw (CA); Martin Kelly Jones, Vancouver (CA); Scott Andrew Horstemeyer, Atlanta, GA (US)

(72) Inventors: Maria Khomenko, Pefferlaw (CA); Martin Kelly Jones, Vancouver (CA); Scott Andrew Horstemeyer, Atlanta, GA (US)

(73) Assignee: M. Kelly Jones, Vancouver, British Columbia (CA)

( * ) Notice: Subject to any disclaimer, the term of this patent is extended or adjusted under 35 U.S.C. 154(b) by 0 days.

(21) Appl. No.: 13/658,353

(22) Filed: Oct. 23, 2012

Related U.S. Application Data

(60) Provisional application No. 61/694,981, filed on Aug. 30, 2012, provisional application No. 61/695,001, filed on Aug. 30, 2012, provisional application No. 61/695,044, filed on Aug. 30, 2012.

(51) Int. Cl.
*H04W 4/02* (2009.01)

(52) U.S. Cl.
USPC .......................................... 455/418; 701/201

(58) Field of Classification Search
USPC . 455/418, 456.3; 701/201, 213, 434; 345/158
See application file for complete search history.

(56) References Cited

U.S. PATENT DOCUMENTS 7,499,797 B2 * 3/2009 Mok .............................. 701/434
2010/0156788 A1 * 6/2010 Nakaoka ....................... 345/158

* cited by examiner

*Primary Examiner* — Phuoc Doan
(74) *Attorney, Agent, or Firm* — Thomas | Horstemeyer, LLP

(57) ABSTRACT

Systems, apparatus, and methods are disclosed for accurately identifying a moving thing motion activity (MTMA) associated with a mobile thing (MT) using only accelerometer data from a wireless communication device (WCD) transported by the MT so as to enable or initiate a further one or more activity based actions. One such method, among others, comprises: (a) receiving first and second data from an accelerometer associated with a wireless communication device (WCD) transported by a mobile thing (MT), the first and second data indicative of acceleration of the WCD; (b) determining reference data that defines a reference framework in two dimensions (2D) of space from the first data; (c) normalizing the second data with the reference data so that the second data can be analyzed in the 2D space; and (d) identifying a mobile thing motion activity (MTMA) associated with the MT based upon the normalized second data.

23 Claims, 19 Drawing Sheets

120

ACCEROMETER OUTPUT DATA STRUCTURE

| TIME STAMP 121 | X-AXIS ACCELERATION 122 | Y-AXIS ACCELERATION 123 | Z-AXIS ACCELERATION 124 |
|---|---|---|---|

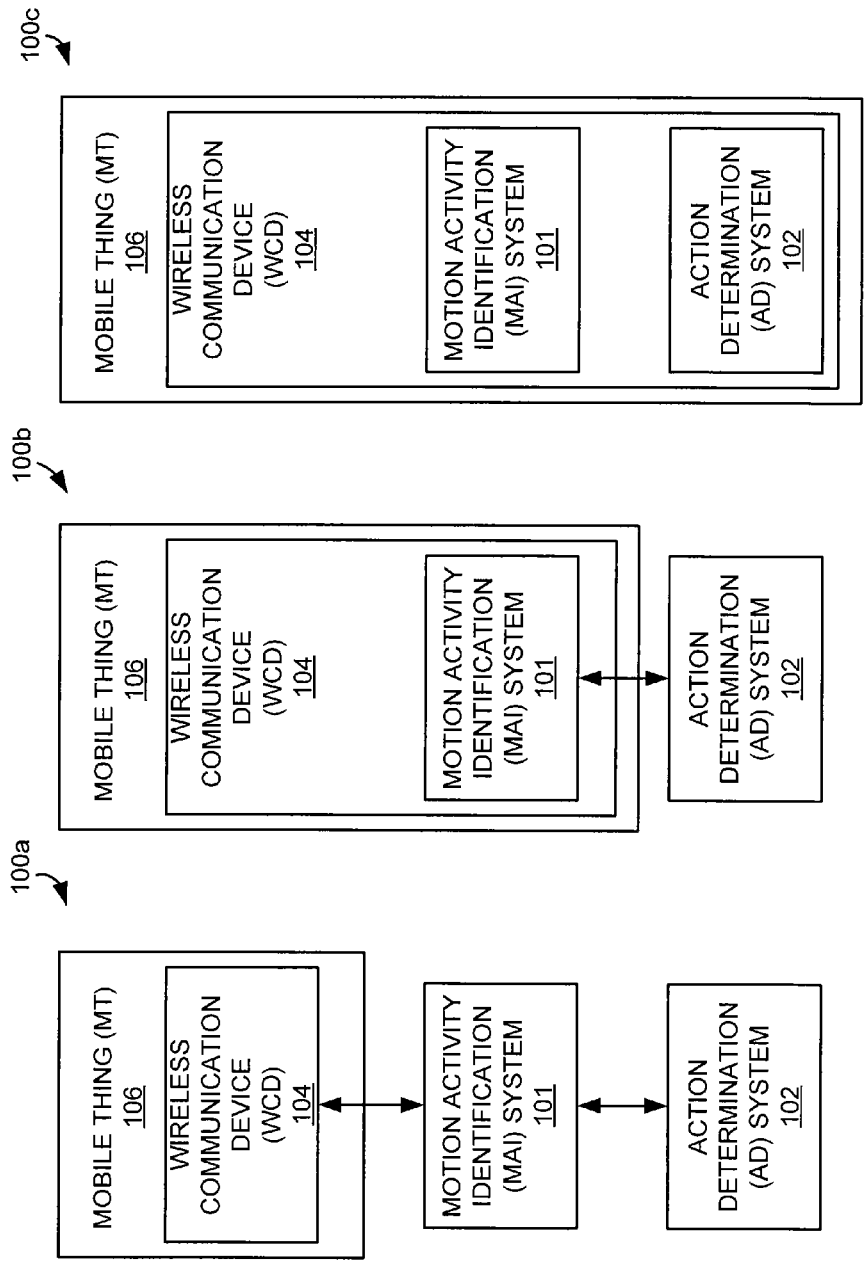

Determining A Users Activity From Accelerometer Data

Rotation of the Axes

1. Gravity has net magnitude of 1 and the direction is always downwards

2. Gravity is always present, so if net acceleration magnitude is not 1, the other forces are present in the system (there is motion present).

3. If net acceleration magnitude is detected to be 1, then only gravity is felt at that point and therefore, the direction of the vector is the downwards direction

4. These, effectively stationary, points can be found by selecting data points with magnitude sufficiently close to 1. For example, within $\delta = 0.02$ of one. Use this direction of this vector as the positive z-axis.

5. Experimentally, in the preferred embodiment, such points are found 3-6 times per second. Thus, even if for any reason a point is falsely classified as stationary, the program would quickly self-correct.

6. To classify the above mentioned direction as the positive z-axis, determine the rotation matrix which would rotate the position of this reference point, (x, y, z) to be on the positive z-axis, point (0,0,1)

7. Do this in two steps:
1) Rotate about the x-axis so that the y-coordinate is zero
2) Rotate about the y-axis so that the x-coordinate is zero

8. Note, that the two steps can be done in reverse to obtain a different rotation matrix, which would still orient the vector along positive z-axis

9. For the sub-consequent points which are not within $\delta$ of one, the same rotation matrix is used.

10. As mentioned in (8), there is more than one unique matrix which ensures that the gravity is oriented along the vertical axis. The direction can be chosen as positive or negative. Also, without loss of generality, a different axis may be chosen.

11. The x and y coordinates of non-stationary would be different depending on which direction the rotation is performed.

12. The magnitude of the net horizontal acceleration will be the same regardless of which matrix is used.

13. The rotation may also be performed based on data from different sensors (gyroscope, compass, etc). Also, addition rotation of the vector may be done as needed.

14. When the next stationary point is found, a new rotation matrix is generated and the old one is discarded.

FIG. 5

Determining A Users Activity From Accelerometer Data

Basic Parameters

1. Average, mean or median of the data set. A measure of where the data is centred.

2. Standard deviation or variance. A measure of how wide is the data distribution.

3. The above can be calculated based on the whole interval or partial intervals. Such as average of the first half of data points or average of only one (or more) components.

4. Average/variance can be calculated for sets of points selected from the data, such as the average of peak values, can average several data intervals over prolonged period of time.

5. Averaging and Variance alone can obtain a certain degree of accuracy, requiring very little computation time and in some cases are sufficient.

6. It is possible to apply these basic methods without rotating the data.

7. After certain accuracy is obtained with average and variance alone, it is very difficult to improve it without resorting to more sophisticated methods.

Advanced Parameters

1. Higher order moments, calculated about mean, zero or other value.

2. Root mean square (also can be used as an alternative to standard deviation) or generalized mean.

3. Signal Magnitude area, that is the area encompassed by the magnitude of the signal.

Fourier Transform

1. Identifying the peaks, which give the amplitude and frequency of all the oscillatory motions present.

2. Since the signal contains real values only, the FT will be symmetric, and only half can be used to save on computation costs.

3. The human motion, such as walking or running tends to have lower frequencies and motion with a transport (car, bike, etc) has higher frequencies. Thus, the above techniques (averaging, rms, etc) are applied in higher and lower frequency regions to compare their strength.

4. Alternative transforms may be performed, such as Laplace transform, various integral transforms, logarithmic and etc.

FIG. 6

Determining A Users Activity From Accelerometer Data

Stopped

1. The standard deviation is low, while it will still be non-zero due to background noise, generally it will be below a certain threshold that clearly separates the case of stationary device.

2. Horizontal acceleration will also be close to zero and vertical close to one, since a stationary device mainly experiences the force of gravity.

3. Typically, average and standard deviation are sufficient to identify when the device is not moving and methods with higher computation costs are not required, although they could be used.

4. Identifying a stationary phone would generally not require rotation of the axis.

Running

1. During running the user is often in a state of free fall with strong impact every time a step it taken. This results in significantly lower averages than other motions.

2. Strong impact during running also results in larger change in velocity, thus, running motions has a significantly higher standard deviation.

3. If the running motion is sufficiently pronounced it may be separated from other MTMA based on average and standard deviation values alone.

4. This does not identify all of the running motion but about 65% of the initial test group.

FIG. 8

Determining A Users Activity From Accelerometer Data

Identifying Most Probable Motion

1. Compute the values for all the parameters, including higher order moments, averages of higher frequencies, peak and etc.

2. Define the starting likelihood counter for each of the 4 motions as 0.

3. Examine every calculated value and adjust the likelihood accordingly. For example a peak with high amplitude at a low frequency the likelihood of running should be increased and of driving decreased.

4. After all the cases are examined, the highest counter is the most probable motion.

5. In case of there being two or more highest counter the preference is given to motion that is historically more likely to appear in a tie. For example in one of the embodiments, between biking and walking the preference is given to walking.

6. Also, if the two highest counters are very close to each other, the result can be treated as conditional until consequent data confirms the motion.

7. In the present embodiment, the most probable motion algorithm is called if the MTMA was not identified as standing or running based on the average and standard deviation of the accelerometer data.

FIG. 9

Determining A Users Activity From Accelerometer Data

Walking

1. If 3$^{rd}$ order moment of horizontal acceleration about zero is above a certain threshold, reduce walking likelihood by one.

2. If the average of FT is significantly higher than the average higher frequency, then increase the likelihood of walking.

3. If RMS of the net acceleration vector is sufficiently high, then increase likelihood of walking accordingly.

4. If 4$^{th}$ order moment about zero is too low, reduce the likelihood of walking and if the moment is sufficiently high, increase it.

5. If FT only shows motions with very low amplitude and there is very little motion and low standard deviation (a case resembling standing), then reduce likelihood of walking by two.

6. If RMS of the vertical acceleration is above a certain threshold, then reduce likelihood of walking accordingly.

7. If there are no peaks present in FT, reduce likelihood of walking.

8. If the highest peak is at a slightly higher frequency and has sufficiently low amplitude, reduce likelihood of walking.

9. If there is a prominent peak at low frequency, increase the likelihood of walking.

FIG. 10A

Determining A Users Activity From Accelerometer Data

Running

1. About 65% of running is identified based on average and standard deviation alone.

2. Running is still a possible motion if the average is high.

3. If there is presence of high amplitude at a low frequency and the average vertical acceleration is still less than one, then the motion is identified as running and analysis terminated.

4. If the average of FT is less than a multiple of the average higher frequency, then reduce the likelihood of running according to the factor used.

5. If standard deviations (both vertical and horizontal) are significantly high, increase the likelihood of running.

6. If the 4$^{th}$ order moment of the vertical acceleration about zero is above two, increase the likelihood by one.

7. If there is very little activity (low standard deviation, lack of peaks in the Fourier transform) then running is almost certainly not the motion.

8. If the RMS of the vertical acceleration about zero is sufficiently high, increase the likelihood of running.

FIG. 11A

Determining A Users Activity From Accelerometer Data

Driving

1. If 3$^{rd}$ order moments of horizontal acceleration about zero and about its mean are sufficiently high, reduce driving likelihood.

2. If 3$^{rd}$ order moment of vertical acceleration about its mean is sufficiently high, reduce driving likelihood.

3. If the average of FT is less than twice the average higher frequency, then increase the likelihood of driving (amount of increase depends on how significant the difference is).

4. If the average of FT is significantly higher than the average of higher frequencies, then reduce likelihood of driving.

5. If RMS of the net acceleration vector is large, then reduce likelihood of driving accordingly.

6. If standard deviation (for both vertical and horizontal accelerations) is significantly high, reduce the likelihood of driving.

7. If 4$^{th}$ order moment about zero is small enough, increase the likelihood of driving and if the moment is large, reduce it.

8. If FT only shows motions with very low amplitude and there is very little motion and low standard deviation (a case resembling standing), then increase driving likelihood significantly.

9. If the highest amplitude present is at a very large frequency, then the motion can only be driving and method can be terminated with results returned.

10. A singular peak tends to correspond to the motion of biking and in order to reduce the false biking identification during driving, if that singular peak has relatively low amplitude, increase likelihood of driving as well.

11. If the highest peak has low amplitude or there are no peaks found, then increase likelihood of driving.

FIG. 12A

SYSTEMS AND METHODS FOR DETERMINING MOBILE THING MOTION ACTIVITY (MTMA) USING ACCELEROMETER OF WIRELESS COMMUNICATION DEVICE

RELATED APPLICATIONS

This application claims priority to the following applications: U.S. Provisional Application Ser. No. 61/694,981, filed Aug. 30, 3012, entitled "SYSTEMS AND METHODS FOR DETERMINING MOBILE THING MOTION ACTIVITY (MTMA) USING ACCELEROMETER OF WIRELESS COMMUNICATION DEVICE"; U.S. Provisional Application Ser. No. 61/695,001, filed Aug. 30, 3012, entitled "SYSTEMS AND METHODS FOR DETERMINING MOBILE THING MOTION ACTIVITY (MTMA) USING SENSOR DATA OF WIRELESS COMMUNICATION DEVICE (WCD) AND INITIATING ACTIVITY-BASED ACTIONS, and U.S. Provisional Application Ser. No. 61/695,044, filed Aug. 30, 2012, entitled "NOTIFICATION SYSTEMS AND METHODS THAT EMPLOY ACTIVITY DETECTION", all of the foregoing of which are incorporated by reference herein in their entireties.

FIELD OF THE INVENTION

The present invention relates electronic messaging technologies, and more particularly, to systems, methods, and apparatus for accurately identifying a motion activity (MA) associated with a mobile thing (MT) using only accelerometer data from a wireless communication device (WCD) transported by the MT so as to enable or initiate a further one or more activity based actions.

BACKGROUND

Electronic messaging and notification systems have been evolving over time, particularly in the last two decades. Much of this development has been due to the expansion of electronic networking, including the Internet, and the incorporation of more sophisticated capabilities in personal portable wireless communications devices (WCDs), for example, smartphones.

SUMMARY OF THE INVENTION

After much thought, study, and analysis, the inventors have envisioned that the next generation of at least one species of messaging systems should be based at least in part upon a mobile thing motion activity (MTMA; e.g., walking, running, biking, driving, etc.) associated with an MT that is transporting (e.g., carrying, moving, etc.) the WCD. In many scenarios, the MT is capable of more than one MTMA. Detecting that an MT is currently involved in, has transitioned from, and has transitioned into an MTMA can lead to initiating more intelligent actions that are activity based. Various inventions associated with this next generation of electronic messaging systems are set forth hereafter.

Activity detection can be a problematic and difficult task. To date, at least a couple studies have been undertaken to determine how a person's activity can be determined with an accelerometer. However, neither study has determined a way to identify the activity with sufficient accuracy when several are possible, and furthermore, neither study suggests taking further intelligent actions based upon the detected activity (as the present inventors suggest herein).

For example, see Nham, Siangliulue, and Yeung, "Predicting Mode of Transport From iPhone Accelerometer Data," CS 229: Machine Learning Final Projects, Standford University (2008), which is incorporated herein by reference. This paper describes a university project which concentrated on identifying 4 motions (walk, run, drive, and bike) with an accelerometer associated with a smartphone. The data results were collapsed into a single vector in 3D rather than separate components. These scientists did not rotate the data and use the net magnitude to simplify their analysis. The data was collected by always placing the smartphone in a hip pocket. While the orientation of the phone is randomized, the position on the body was always the same. The project also used training methods, to create a training matrix with magnitudes of Fourier coefficients, which were then used to classify the motion. The values used in the analysis were mean, variance, energy of the signal, and FFT components. More sophisticated parameters, such as higher order moments, were not used. The overall results were accurate for walking and running, but were less than 50% for biking and barely over 50% for driving. The research admits that they were unable to improve the accuracy. The experimental research was conducted based on only 4 users, the system was trained, and the paper states that due to time constraints, they did not have time to explore the accuracy further.

As another example of an attempt to detect motion activity, see Figo, Diniz, Diogo, Ferreira, and Joo, Cardoso, "Preprocessing Techniques for Context Recognition from Accelerometer Data," Personal and Ubiquitous Computing 14(7): 645-662 (2010), which is incorporated herein in its entirety. This paper looks at various methods of analyzing accelerometer data. It lists a number of methods used in signal processing and briefly describes their applications. It does not provide detailed practical applications of any methods. The paper discusses that using averages and differences between averages can be effective and that other methods have "disappointing performance." The research focused on distinguishing two activities: walking and running, and then three activities: walking, running and jumping. Also, the accelerometer was always positioned in the right hand pocket. The data was collected via Nintendo Wii Remote. The analysis only uses net force ($\sqrt{x^2+y^2+z^2}$) and did not use vertical/horizontal directions nor rotation. Overall, the research admits that the results are "not outstanding" and many of the methods with high complexity and computational cost were expected to perform better.

As compared to the analyses set forth in the Nham and Figo papers, the inventors of the present disclosure have discovered much more efficient and accurate ways to determine the motion activity of an MT, as will be described in sections to follow.

Furthermore, the inventors further envision that location data (e.g., global positioning system (GPS) or gyroscope) data and other sensor data associated with the WCD may be used to determine or assist with determining the MTMA. However, in many instances, it may be necessary or desirable to determine the MTMA with only the accelerometer data. As an example, the MTMA may need to be identified in a context where the WCD cannot receive a GPS signal. As another example, it may be desirable to determine the MTMA without turning on the GPS receiver in order to preserve power.

The present disclosure provides systems, methods, and apparatus for accurately identifying a mobile thing motion activity (MTMA) associated with a mobile thing (MT) using only accelerometer data from a wireless communication device (WCD) transported by the MT so as to enable or initiate a further one or more intelligent activity based actions.

One embodiment, among others, is a method that can be summarized by the following steps: receiving a time value and three streams of data sample values from an accelerometer of a WCD that is transported by an MT, each data sample value indicative of an acceleration of the WCD along an axis of a three dimensional (3D) coordinate system at a corresponding time value; recognizing a particular set of data sample values as a reference in the 3D coordinate system for defining a relationship between an orientation of the WCD and a two dimensional (2D) coordinate system; computing reference data based upon the recognition of the particular set, the reference data defining a relationship between each set of subsequent non-reference data sample values and the particular reference set of data sample values in the 2D coordinate system; calculating movement data in the 2D coordinate system of one or more other non-reference data sample values based upon the reference data; and determining a moving thing motion activity (MTMA) associated with the MT based upon the movement data. An embodiment of a related system has a computer-based architecture and computer software that is stored in memory and executed by one or more processors for performing the foregoing steps. Yet another embodiment of a related system can be implemented in software and/or hardware and has a means for performing each of the aforementioned steps.

Another embodiment, among others, is a method that can be summarized by the following steps: receiving first and second data from an accelerometer associated with a WCD transported by an MT, the first and second data indicative of acceleration of the WCD; determining reference data that defines a reference framework in 2D space from the first data; normalizing the second data with the reference data so that the second data can be analyzed in the 2D space; and identifying an MTMA associated with the MT based upon the normalized second data. An embodiment of a related system has a computer-based architecture and computer software that is stored in memory and executed by one or more processors for performing the foregoing steps. Yet another embodiment of a related system can be implemented in software and/or hardware and has a means for performing each of the aforementioned steps.

Yet another embodiment, among others, is a method that can be summarized by the following steps: receiving a time value and three streams of data sample values from an accelerometer of a WCD that is transported by an MT, each data sample value indicative of an acceleration of the WCD along an axis of a 3D coordinate system at a corresponding time value; computing reference data, the reference data defining a relationship between data sample values and a reference framework to enable comparison of 3D sets of data sample values; calculating movement data for each set based upon the reference data; and determining an MTMA associated with the MT based upon the movement data.

Other systems, methods, apparatus, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWING FIGURES

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2A is a block diagram illustrating an exemplary first set of embodiments of an MTMA identification/action system in accordance with the present disclosure, wherein a motion activity identification (MAI) system and an action determination (AD) system are implemented remotely from a wireless communication device (WCD) that is transported by the MT of FIG. 1.

FIG. 2B is a block diagram illustrating an exemplary second set of embodiments of an MTMA identification/action system in accordance with the present disclosure, wherein the MAI system is implemented in or locally to the WCD and the AD system is implemented remotely from the WCD that is transported by the MT of FIG. 1.

FIG. 2C is a block diagram illustrating an exemplary third set of embodiments of an MTMA identification/action system in accordance with the present disclosure, wherein the MAI system and the AD system are implemented in or locally to the WCD that is transported by the MT of FIG. 1.

FIG. 5 is an example of a methodology that can be used by the MAI system of FIG. 2D to establish a reference framework in two dimensions of space (essentially a cylindrical coordinate system, wherein the reference framework enables normalization of sampled data so that sampled data can be intelligently compared).

FIG. 6 is a description of statistical parameters in the time domain and the frequency domain that can be utilized by the MAI system of FIG. 2D to identify a most probable MTMA.

FIG. 8 is a description of methodology in the time domain, which relies on basic parameters only (see FIG. 6), that can be used by the MAI system of FIG. 2D to quickly identify whether the MTMA is stopped or is running (as these MTMAs are sometimes more easily identified than the others) in the exemplary methodology of FIG. 7.

FIG. 9 is a description of parameters/methodology in the time domain and frequency domain that can be used by the MAI system of FIG. 2D to identify the most probable MTMA from the set of MTMAs in the exemplary methodology of FIG. 7.

Figure 10B:
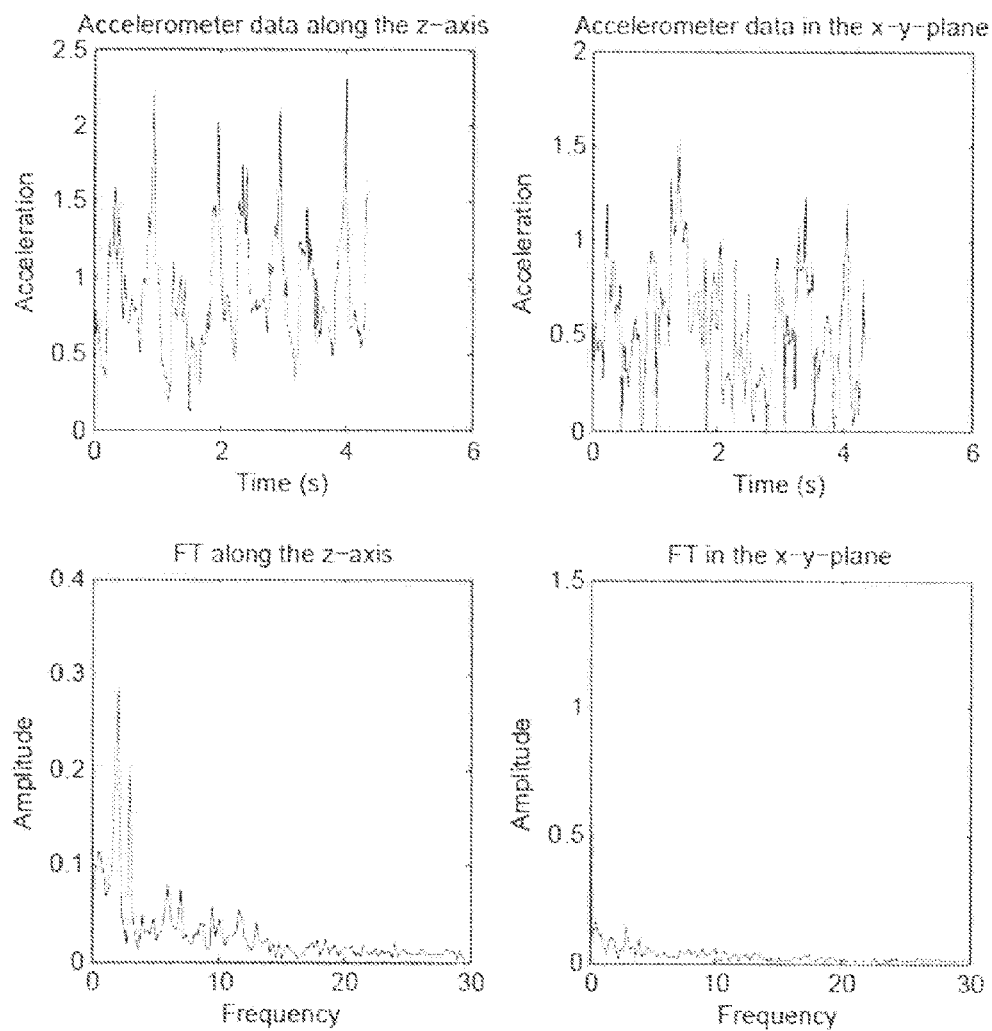
FIG. 10A is a description of parameters/methodology in the time domain and frequency domain that can be used by the MAI system of FIG. 2D to analyze walking in the exemplary methodology of FIG. 7.

FIG. 10B is an example of time domain and frequency domain graphs, in connection with walking, that shows an example of each of the following (left to right, top then bottom): (1) acceleration versus time along the vertical axis (z-axis) of the reference coordinated system over a time period, (2) acceleration versus time in the horizontal plane (x-y plane) of the reference coordinate system over the same time period, (3) amplitude versus frequency along the vertical axis (z-axis) of the reference coordinate system over the same time period, (4) amplitude versus frequency in the horizontal plane (x-y plane) of the reference coordinate system over the same time period.

Figure 2D:
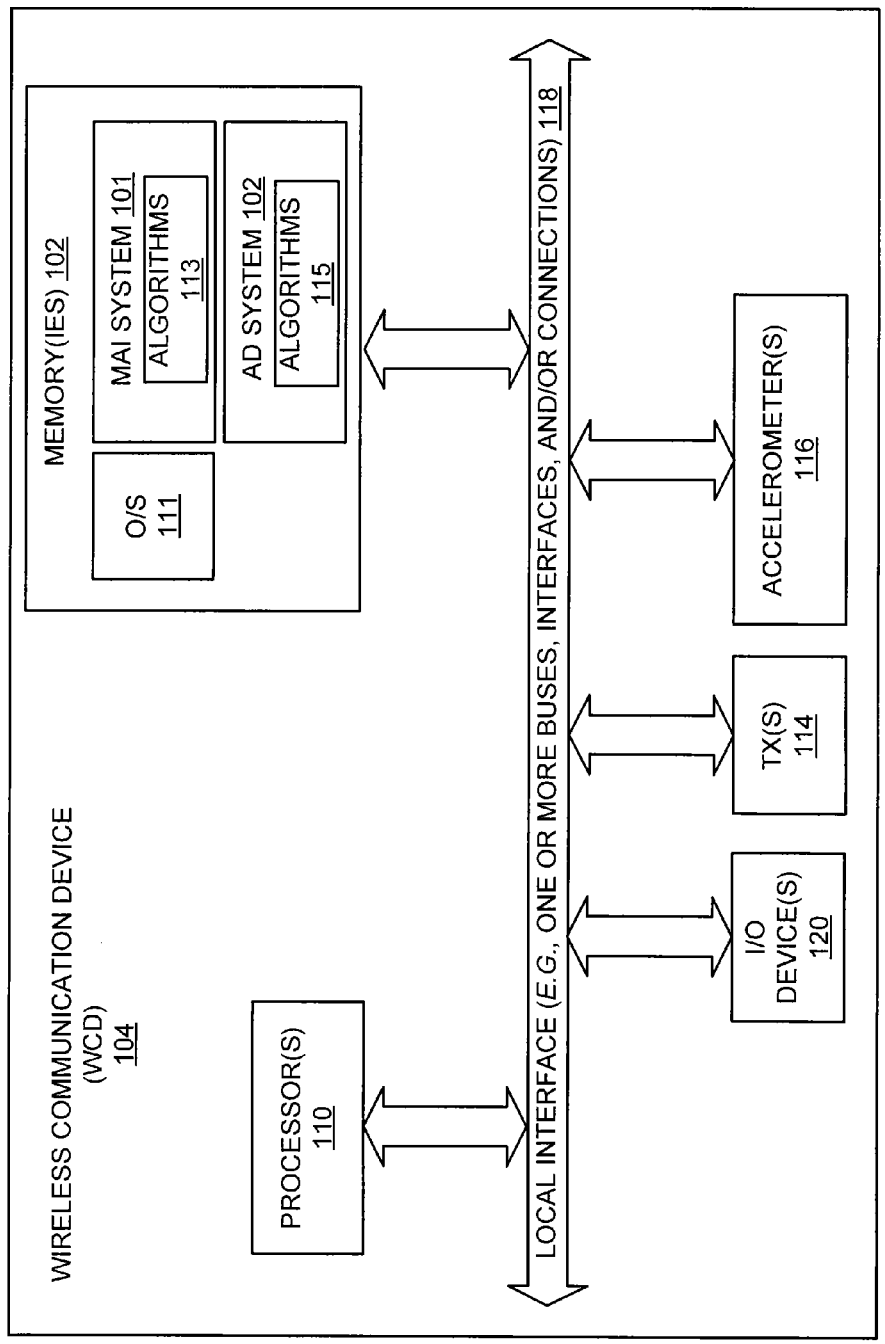
FIG. 2D is a block diagram illustrating an example of a computer system employing the architecture of FIG. 2C, wherein the MAI system and the AD system are implemented in software within the wireless communication device (WCD).

FIG. 11A is a description of parameters/methodology in the time domain and frequency domain that can be used by the MAI system of FIG. 2D to analyze running.

Figure 11B:
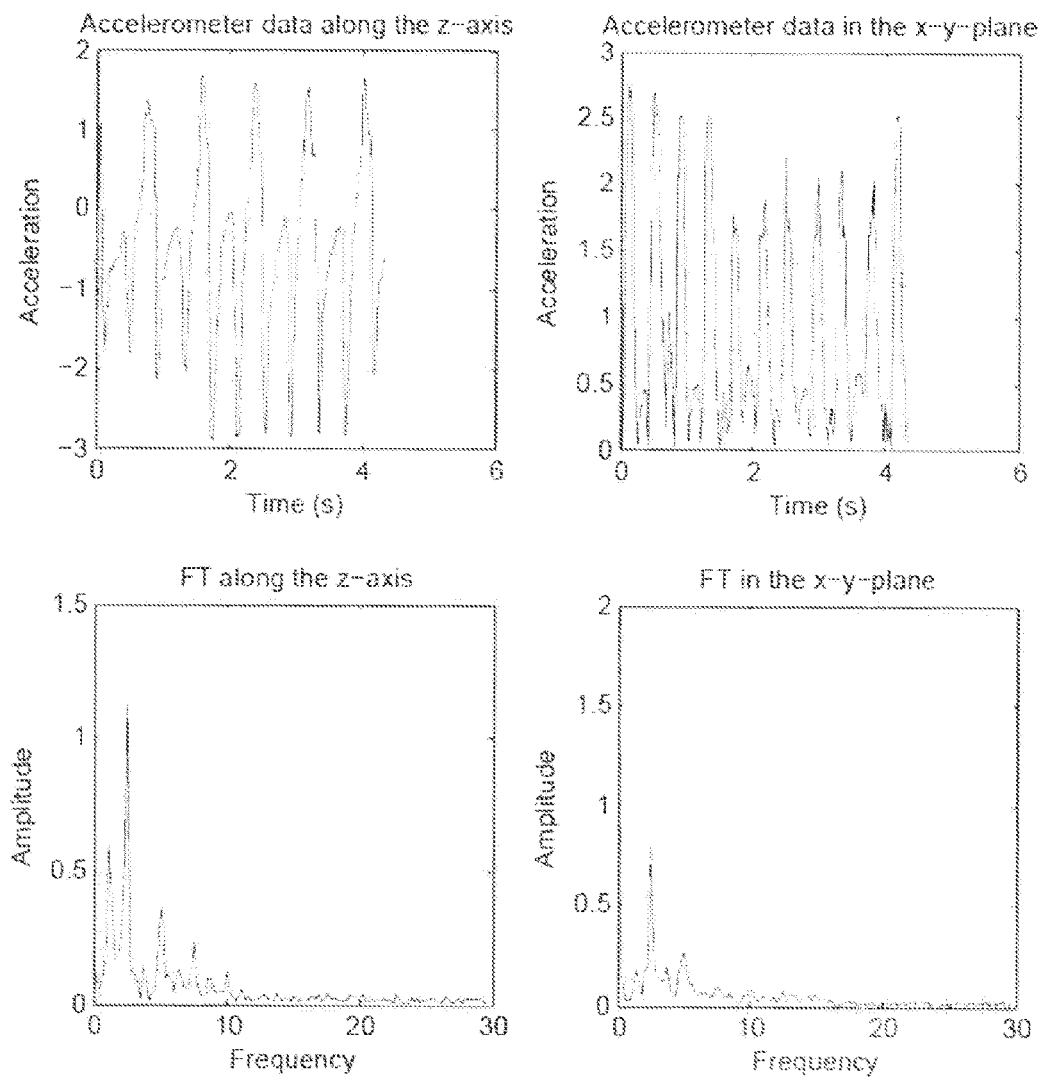

FIG. 11B is an example of time domain and frequency domain graphs, in connection with running, that shows an example of each of the following (left to right, top then bottom): (1) acceleration versus time along the vertical axis (z-axis) of the reference coordinated system over a time period, (2) acceleration versus time in the horizontal plane (x-y plane) of the reference coordinate system over the same time period, (3) amplitude versus frequency along the vertical axis (z-axis) of the reference coordinate system over the same time period, (4) amplitude versus frequency in the horizontal plane (x-y plane) of the reference coordinate system over the same time period.

FIG. 12A is a description of parameters/methodology in the time domain and frequency domain that can be used by the MAI system of FIG. 2D to analyze driving.

Figure 12B:
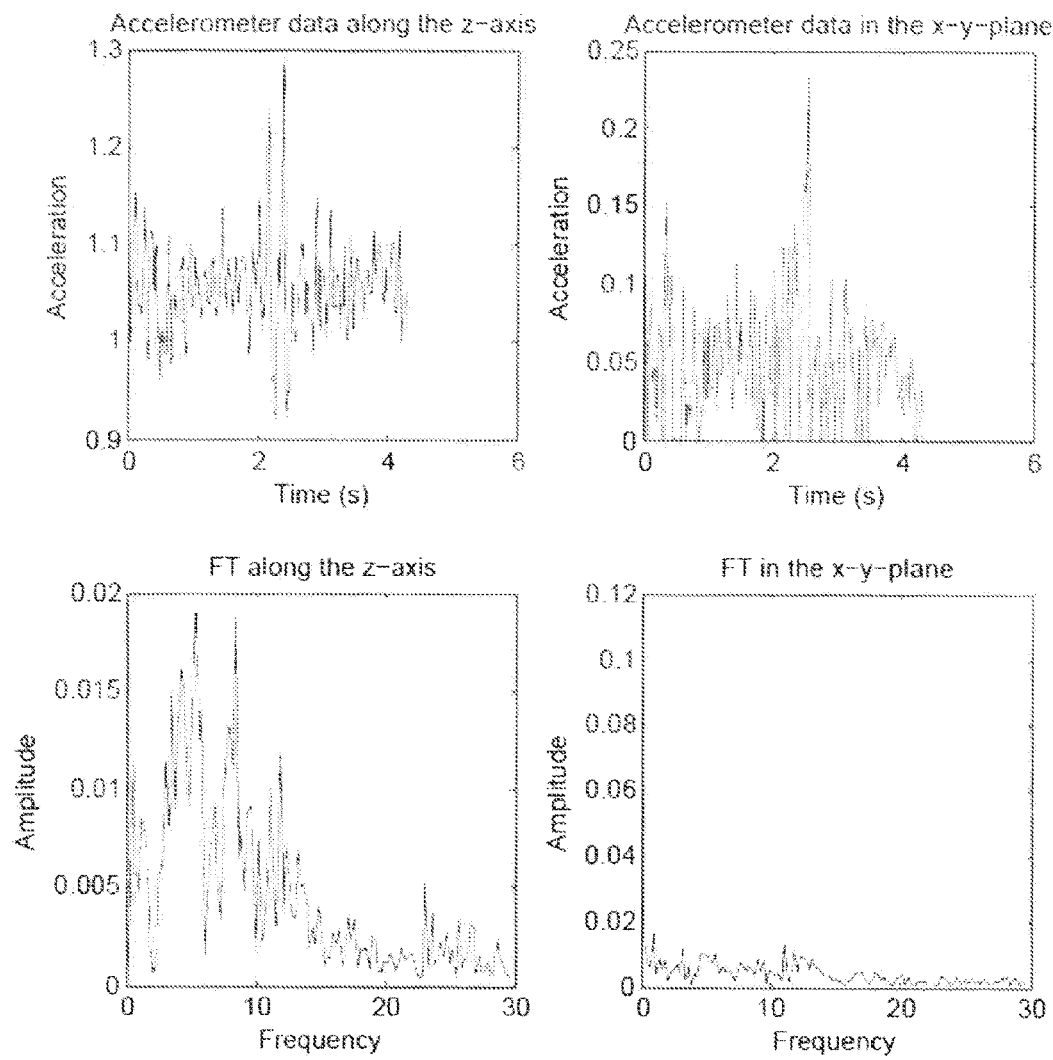

FIG. 12B is an example of time domain and frequency domain graphs, in connection with driving, that shows an example of each of the following (left to right, top then bottom): (1) acceleration versus time along the vertical axis (z-axis) of the reference coordinated system over a time period, (2) acceleration versus time in the horizontal plane (x-y plane) of the reference coordinate system over the same time period, (3) amplitude versus frequency along the vertical axis (z-axis) of the reference coordinate system over the same time period, (4) amplitude versus frequency in the horizontal plane (x-y plane) of the reference coordinate system over the same time period.

Figure 13A:
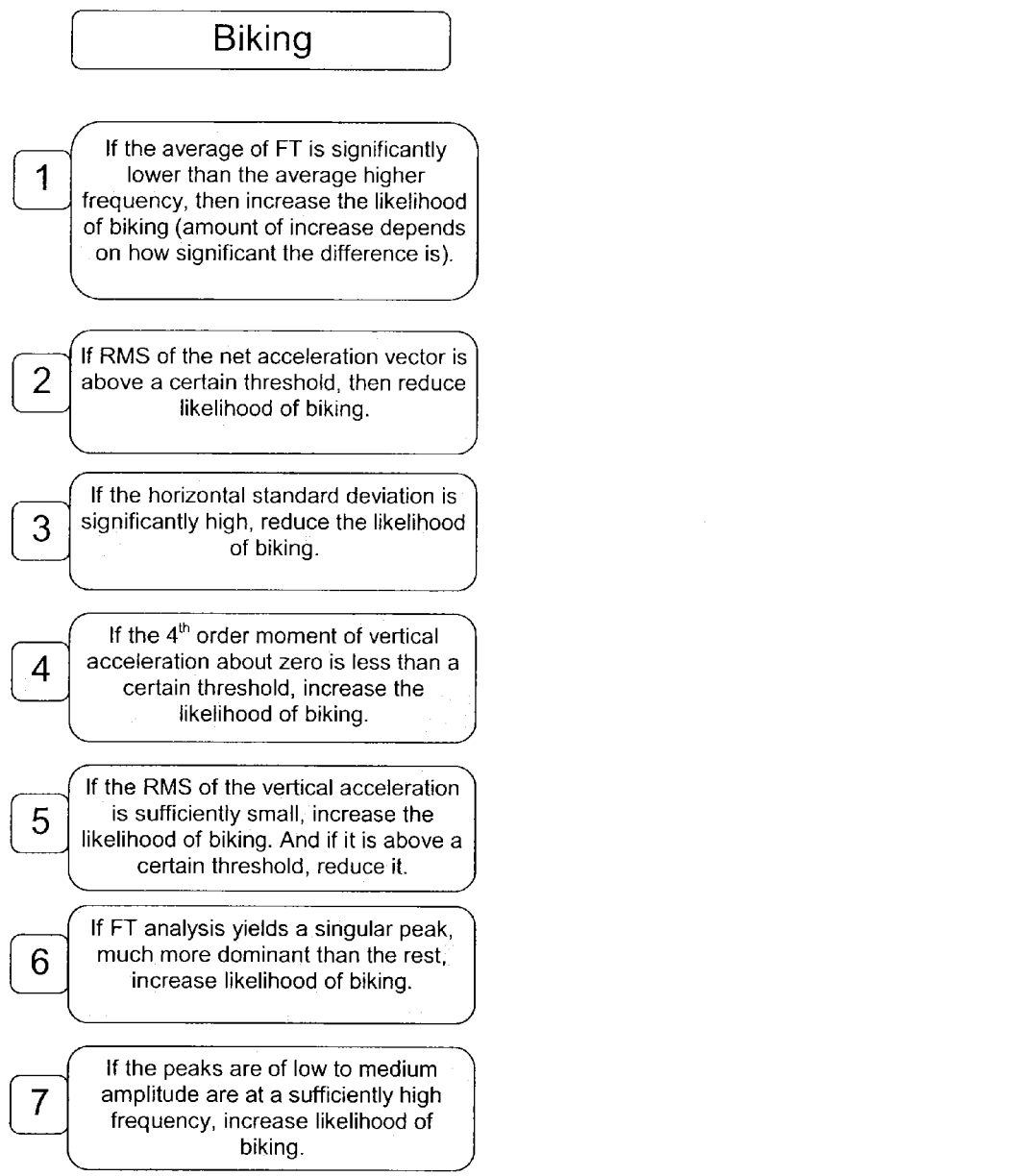

FIG. 13A is a description of parameters/methodology in the time domain and frequency domain that can be used by the MAI system of FIG. 2D to analyze biking.

Figure 13B:
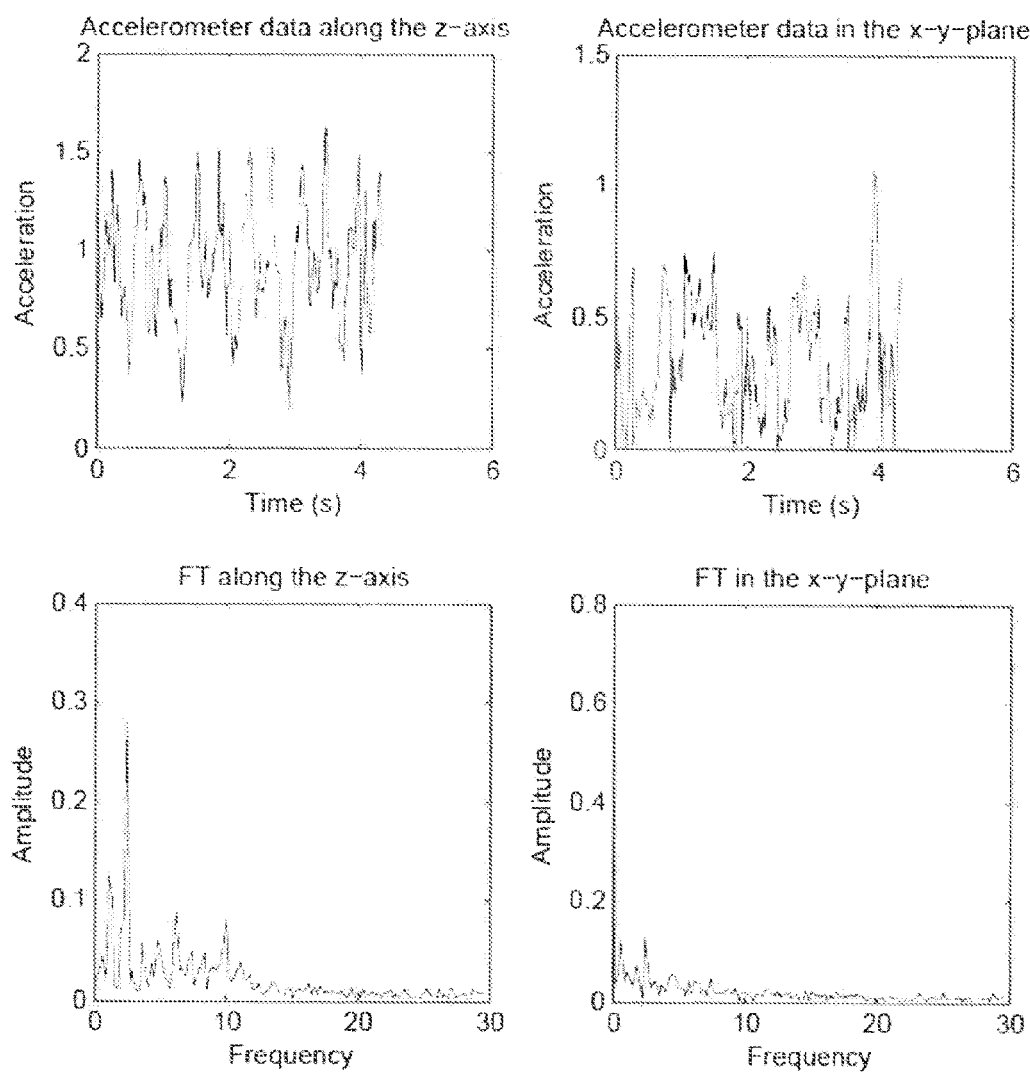

FIG. 13B is an example of time domain and frequency domain graphs, in connection with biking, that shows an example of each of the following (left to right, top then bottom): (1) acceleration versus time along the vertical axis (z-axis) of the reference coordinated system over a time period, (2) acceleration versus time in the horizontal plane (x-y plane) of the reference coordinate system over the same time period, (3) amplitude versus frequency along the vertical axis (z-axis) of the reference coordinate system over the same time period, (4) amplitude versus frequency in the horizontal plane (x-y plane) of the reference coordinate system over the same time period.

DETAILED DESCRIPTION

A. MTMA Identification/Action System
B. MAI System Overview
C. Overview of Mathematical Techniques That can be used by MAI System
   1. Fourier Transform
D. Normalization (Rotating) Method
   1. Determining θ
   2. Code Description for rotating One Data Point
E. Computer Based WCD With Software Based MAI System and AD System
F. Accelerometer Output Data Structure
G. MAI System
   1. First Set of Embodiments
   2. Second Set of Embodiments
   3. Third Set of Embodiments
   4. Fourth Set of Embodiments
     a. Rotation of the Axes
     b. Statistical Parameters
        i. Basic parameters
        ii. Advanced Parameters
        iii. Fourier Transform (FT)
     c. Architecture/Operation
        i. Analysis for Stationary (Stopped, Standing)
        ii. Analysis for Running (First Time)
        iii. Analysis for Driving (First Time)
        iv. Analysis for Running (Second Time)
        v. Identifying Most Probable MTMA with Comparative Analysis
        vi. Analysis for Walking (First Time)
        vii. Analysis for Running (Third Time)
        viii Analysis for Driving (Second Time)
        ix Analysis for Biking (First Time)
H. Action Determination System
I. Variations, Modifications, and Other Possible Applications
J. Appendix The present disclosure provides systems, methods, and apparatus for accurately identifying a mobile thing motion activity (MTMA) associated with a mobile thing (MT), such as a person, by analyzing data produced by an accelerometer associated with a wireless communication device (WCD) transported (e.g., carried, moved, etc.) by the MT, so as to enable or initiate a further one or more intelligent activity based actions, for example, but not limited to, generation of a report, creation and communication of a message to another communication device, actuation of a local WCD function, etc. The MTMAs can include, for example but not limited to, standing, walking, running, driving, skiing, hiking, skateboarding, sky diving, bicycling, unicycling, golfing, falling down, swimming, riding a ski lift, riding in a motor vehicle, motorcycle, airplane, train, or water vessel, accelerating or decelerating in a motor vehicle, motorcycle, train, airplane, or water vessel, riding in a wheelchair, etc. The MT can be a person or other vehicle capable of mobility and of transporting the WCD. The WCD can be any device that is transportable by the MT that can wirelessly communicate accelerometer information, identified MTMA information, and/or action determination (AD) information in order to enable implementation of an intelligent action based upon the identified MTMA. Nonlimiting examples of a WCD include a wireless telephone, a wireless smartphone, etc.

A. MTMA IDENTIFICATION/ACTION SYSTEM

Figure 1:
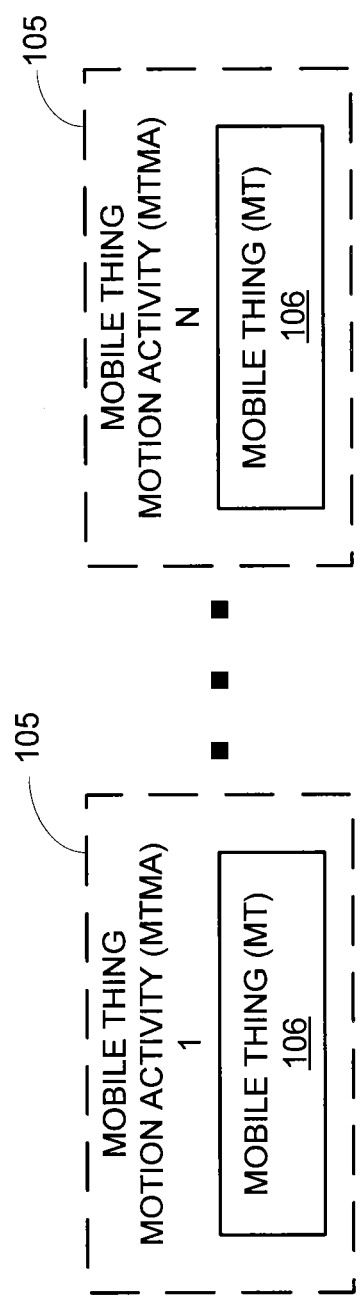
FIG. 1 is a block diagram illustrating that a mobile thing (MT) can be involved in a plurality of mobile thing motion activities (MTMAs) 1 to N, where the number of activities, N, may be adjusted to specific user needs.

FIG. 1 is a block diagram illustrating that the MT 106 can be involved in one or more, many times a plurality of MTMAs 105, denoted 1 to N, where N is any number. In order to practice activity based messaging, the MTMA 105 in which the MT 106 is involved needs to be identified.

FIGS. 2C, 2B, and 2C show block diagrams illustrating exemplary first, second, and third sets of embodiments 100a, 100b, 100c of an MTMA identification/action system, respectively.

With reference to FIG. 1A, in the first set of embodiments 100a, a motion activity identification (MAI) system 101 that identifies the MTMA 105 from the accelerometer data and an action determination (AD) system 102 that determines an intelligent activity based action to initiate based upon the MTMA are both remotely situated from the WCD 104 of the MT 106. The MAI system 101 and the AD system 102 may reside in the same or different systems/apparatus, situated locally or remotely. The WCD 104, the MAI system 101, and the AD system 102 can be communicatively coupled via any suitable communication scheme. Furthermore, the MAI system 101 and the AD system 102 of FIGS. 1A, 1B, and 1C can be implemented in computer software, hardware circuitry, or a combination thereof. As an example, each of the MAI system 101 and the AD system 102 could be implemented separately in one or more computer systems. In this embodiment, the WCD 104 can be designed to communicate pure accelerometer data 120 (FIG. 3), preprocessed accelerometer data, and/or a derivative of either of the foregoing to the MAI system 101 in order to enable the MAI system 101 to identify the MTMA 105. In this embodiment, the MAI system 101 can be designed to communicate an MTMA identity, preprocessed MTMA identity information, and/or a derivative of either of the foregoing to the AD system 102 in order to enable the AD system 102 to take an action or to make a decision regarding an action.

With reference to FIG. 2B, in the second set of embodiments 100b, the MAI system 101 that identifies the MTMA from the accelerometer data is situated in the WCD 104 and the AD system 102 that determines an action to initiate based upon the MTMA 105 is remotely situated from the WCD 104 of the MT 106. The WCD 104 with the MAI system 101 can be communicatively coupled to the AD system 102 via any suitable communication scheme. In this embodiment, the MAI system 101 can be designed to communicate an MTMA identity, preprocessed MTMA identity information, and/or a derivative of either of the foregoing to the AD system 102 in order to enable the AS system 102 to take an action or to make a decision regarding an action.

With reference to FIG. 2C, in the third set of embodiments 100c, both the MAI system 101 that identifies the MTMA 105 from the accelerometer data and the AD system 102 that determines an action to initiate based upon the MTMA 105 are locally situated in the WCD 104 of the MT 106.

B. MAI SYSTEM OVERVIEW

In the preferred embodiment, which is an example among other possible embodiments, the MAI system 101 is designed to identify the following five MTMAs 105: (1) standing, (2) walking, (3) running, (4) biking, and (5) riding.

The MTMA 105 is identified by the MAI system 101 by analyzing only accelerometer data associated with the WCD 104. This set of embodiments is useful when the WCD 104 cannot use or depend upon support from other sensors, such as the GPS receiver, microphone, etc.

The WCD 104 may be positioned anywhere on the body, such as any pockets, in hand or otherwise transported or attached. It may also be inside a bag, including but not limited to, backpacks, purses, or fanny packs. The WCD 104 can also be attached to an object moving with the body, such as attached to a bike during the MTMA 105, placed in a cup holder of a motor vehicle, or attached to a movement assistance device (walker, wheelchair, etc.).

The accelerometer data may be sampled at different frequencies, including varying frequencies. For example, if the WCD 104 is stationary, the frequency may be reduced to save battery power until MTMA 105 is detected; if more data points are needed, the frequency may be increased.

The MTMA 105 is identified as soon as possible, that is, as early as the first 4 seconds of the MTMA 105. If the MTMA 105 is continued, then analysis for longer periods of time may be included. That is, if the MTMA 105 cannot be identified with sufficient certainty, then a longer time interval may be analyzed through a similar (could potentially be the same) mathematical method.

C. OVERVIEW OF MATHEMATICAL TECHNIQUES THAT CAN BE USED BY MAI SYSTEM

The following is a list of some of the methods used in calculations in the preferred embodiment and includes some commentary on possible alternative ways to get a similar result.

The coordinates are rotated so that the downward direction is along the z-axis in an x-y-z orthogonal coordinate system.

The first identification is performed via average and standard deviation (SD). If the MTMA 105 is almost still, then the values are close to constant. In the case of running, the average is much lower and SD is high. The 'average/mean' and 'variance/SD' are most commonly used in previous research on human MTMA 105. The MAI system 101 currently uses average and SD of the vertical acceleration and net horizontal acceleration.

Note that the MAI system 101 could also use median (the middle point rather than average) instead of the mean, and it can use variance instead of SD (square of SD), or another measure of data diversity/variability. These two parameters may be used on the net magnitude vector or components individually.

The MAI system 101 also uses higher order moments about mean or zero (equivalent of root means square (RMS)). This helps to distinguish between certain biking and walking cases of MTMA 105. Moreover, the MAI system 101 of the preferred embodiment uses a 4th order moment of vertical force about zero and 3rd order moment of vertical force about mean.

The current implementation uses two of the higher order moments of the vertical acceleration component. Several other higher order moments were studies, but were determined to be not necessary with respect to the MTMAs this early in the implementation. It is likely that as the number of activities increases, the number of higher order moments used will increase as well. The MAI system 101 also makes use of average square sum integral of the net acceleration from all three directions. Higher values indicate more volatile MTMA 105 such as running or walking. This is sometimes referred to as "signal vector magnitude." See Figo, et al., "Preprocessing Techniques for Context Recognition from Accelerometer Data," *Personal and Ubiquitous Computing*, 14(7): 645-662 (2010), which is incorporated herein by reference in its entirety.

1. Fourier Transform

The MAI system 101 makes use of the Fourier Transform in order to transform the data from time domain representation into frequency domain representation. Once the data is converted to a discrete function of frequency as oppose to time, it becomes straightforward to extract information about all the modes of vibrations, such as amplitudes, frequencies and phases, present in the motion. Thus, it becomes possible to identify aspects such as engine vibrations of a car, frequency of steps during walking or running, pedaling and etc. This information can theoretically be obtained without performing the Fourier Transform, for example, by simply counting the number of peaks in a time domain data sample or curve fitting the data to a sinusoidal function, but these processes are not as commonly used due to higher complexity and increased computation costs.

The use of Fourier Transform can also allow for filtering and removing noise from the data.

In the preferred embodiment, the FT of the vertical direction proved to be more useful than the FT of the horizontal direction.

The first information that the MAI system 101 extracts from the FT is the amplitude and position of all the peaks. The maximum peak (its height being the amplitude) and its corresponding frequency are used to identify presence of a dominant oscillatory motion in the MTMA 105. Smaller peaks of comparable height indicate secondary modes of vibration in the MTMA 105.

The MAI system 101 also focuses on identifying a single peak versus multiple peaks of comparable height. Walking tends to have multiple frequencies, which show up as several peaks. The case of a single tall isolated peak typically indicates that the MTMA is more likely to be the biking motion activity.

The MAI system 101 also compares the average of the FT with the average amplitude at higher frequencies (whether the main weight of the FT is concentrated at the very beginning or if there is MTMA 105 at higher frequencies as well). This comparison is what separates a significant portion of walking and running from biking and driving. The latter two tend to have higher frequencies, whereas walking and running give almost exclusively low frequencies.

The approach described above of comparing the overall average to the average of a subinterval, or comparing parameter values from one interval to those of another may be utilized in both time and frequency domains. The approach may be applied to averages, as well as SD or other computed values used to describe a data as set or subset.

Another important feature of the motion is the total signal strength or the integral square sum. In the present embodiment the total signal strength calculated in the vertical direction proved useful in identifying MTMA 105. Note that by Parseval's theorem, this calculation can be done in either the frequency or the time domain and both will give a similar result (within machine rounding errors).

D. NORMALIZATION (ROTATING) METHOD

In some embodiments, including the preferred embodiment, in order to perform accurate MTMA analysis, the MAI system 101 is designed to perform a normalization process in the form of rotation method upon the sampled data. This normalization process is implemented by the algorithms 113 (FIG. 2D), which will be described in detail hereafter. The normalization process enables more accurate statistical analysis of the accelerometer data 120. The rotation method uses the standard matrix rotation. Example of a rotation about the x-axis by angle $\theta$:

$$\begin{bmatrix} x_{rotated} \\ y_{rotated} \\ z_{rotated} \end{bmatrix} = \begin{bmatrix} 1 & 0 & 0 \\ 0 & \cos(\theta) & -\sin(\theta) \\ 0 & \sin(\theta) & \cos(\theta) \end{bmatrix} \begin{bmatrix} x \\ y \\ z \end{bmatrix}$$

The code performs two rotations: First about the x-axis (making the y coordinate to 0), then about the y-axis (making the x coordinate to 0).

1. Determining $\theta$

The angle of rotation is determined by finding effectively stationary points during the MTMA 105. The stationary points are the ones that have the net force of magnitude 1, that is, Earth gravity, so we know the direction of the force is straight down. A point is considered stationary if the magnitude is within $\delta=0.02$ of 1.

$$\left| 1 - \sqrt{x^2 + y^2 + z^2} \right| < 0.02$$

This stationary point is then used to identify the direction of gravity and to compute a rotation matrix, which will rotate the subsequent data points. When the next stationary point is found, a new rotation matrix is generated.

Figure 3:
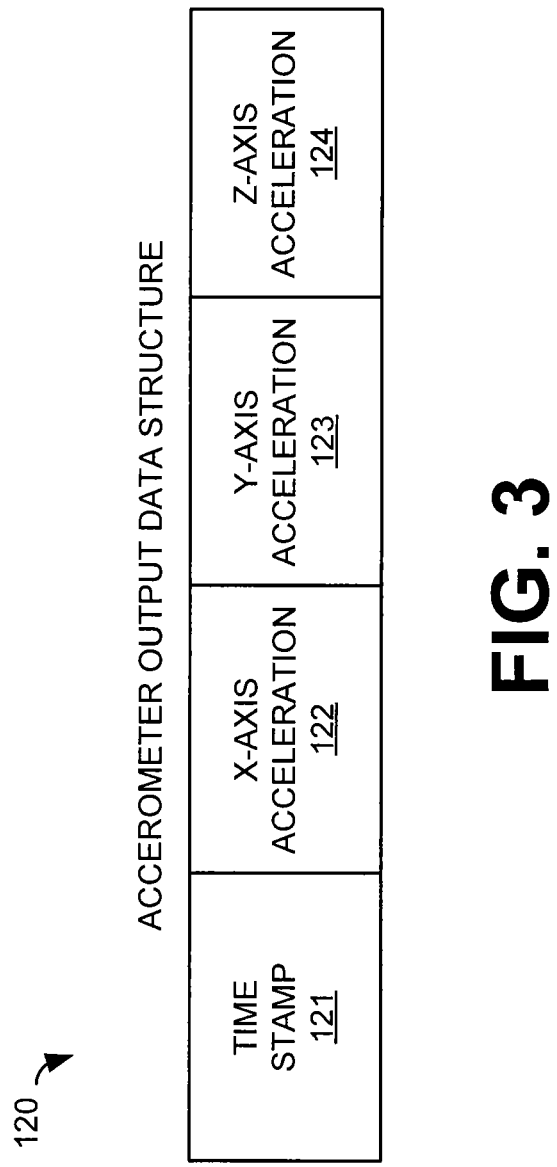
FIG. 3 is an example of an output data structure from a three-axis accelerometer (x, y, z) that can be employed as one of the sensors of FIG. 2D.

In the preferred embodiment, the matrix is updated on average 4 times per second with sampling frequency of 60 data structures, as shown in FIG. 3, per second.

2. Code Description for Rotating One Data Point

The function takes in a data point (x, y, z) and rotates it. First introduce the tolerance parameter $\delta$ or del in the code. This means that if $$\left| 1 - \sqrt{x^2 + y^2 + z^2} \right| < \delta$$

Equivalent of:

$$\delta L < x^2 + y^2 + z^2 < \delta U$$

then the data point satisfying this inequality is assumed to be a "stationary point" and is used to compute the rotation matrix.

```
float del=0.02;
float delU=(1+del)*(1+del);
float delL=(1-del)*(1-del);
float rsize;
```

Perform the rotation about the x-axis. This means the x-coordinate does not change, while the y-coordinate is rotated to 0 (or machine epsilon if the coordinate is computed from the rotation rather than being set to 0 manually).

Calculate the sin(sx) and cos(cx) of the angle $\theta$=arctan y/z.

$$\sin\theta = \frac{y}{\sqrt{y^2 + z^2}} \quad \cos\theta = \frac{z}{\sqrt{y^2 + z^2}}$$

```
rsize=x*x+y*y+z*z;
if ((rsize>delL) && (rsize<delU))
{
dA=1/sqrt(y*y+z*z);
cx=z*dA;
sx=y*dA;
```

Use the values in the rotation matrix:

$$m = \begin{bmatrix} 1 & 0 & 0 \\ 0 & cx & -sx \\ 0 & sx & cx \end{bmatrix} \begin{bmatrix} x \\ y \\ z \end{bmatrix} = \begin{bmatrix} x \\ c_x y - s_x z \\ s_x y + c_x z \end{bmatrix}$$

z2=sx*y+cx*z;
y=cx*y−sx*z;

Repeat this for rotation around the y-axis, but now the angle we are looking at is 2π−arctan x/z=−arctan x/z (by symmetry), where z is the already once rotated value. So, $$\sin\theta = -\frac{x}{\sqrt{x^2+z^2}} \quad \cos\theta = \frac{z}{\sqrt{x^2+z^2}}$$

$$m = \begin{bmatrix} cy & 0 & sy \\ 0 & 1 & -0 \\ -sy & 0 & cy \end{bmatrix} \begin{bmatrix} x \\ y \\ z \end{bmatrix} = \begin{bmatrix} c_y x + s_y z \\ y \\ -s_y x + c_y z \end{bmatrix}$$

dA=1/sqrt(x*x+z2*z2); //repeat the rotation about the y-axis
cy=z2*dA;
sy=−x*dA; //note the negative
x2=x*cy+sy*z2;
z=−sy*x+cy*z2;
x=x2;

The update the total matrix rotation entries:

$$\begin{bmatrix} 1 & 0 & 0 \\ 0 & cx & -sx \\ 0 & sx & cx \end{bmatrix} \begin{bmatrix} cy & 0 & sy \\ 0 & 1 & 0 \\ -sy & 0 & cy \end{bmatrix} = \begin{bmatrix} cy & sxsy & sycx \\ 0 & cx & -sx \\ -sy & cysx & cycx \end{bmatrix}$$

sxsy=sx*sy; cxcy=cx*cy;
cxsy=cx*sy; sxcy=sx*cy;

If the rotation matrix was not updated, use the one from the previous data point (values for it are stored globally.)

$$\begin{bmatrix} cy & sxsy & sycx \\ 0 & cx & -sx \\ -sy & cysx & cycx \end{bmatrix} \begin{bmatrix} x \\ y \\ z \end{bmatrix} = \begin{bmatrix} c_y x + s_x s_y y + c_x s_y z \\ c_x y - s_x z \\ -s_y x + s_x c_y y + c_x c_y z \end{bmatrix}$$

else
{
x2=cy*x+sxsy*y+cxsy*z;
z2=−sy*x+sxcy*y+cxcy*z;
y=cx*y−sx*z;
x=x2; z=z2;
}

E. COMPUTER BASED WCD WITH SOFTWARE BASED MAI SYSTEM AND AD SYSTEM

FIG. 2D is a block diagram illustrating an example of a WCD 104 with a computer based architecture that employs the architecture of FIG. 2C. In this embodiment, the MAI system 101 and the AD system 102 are implemented in computer software within the WCD 104.

With reference to FIG. 2D, the WCD 104 includes at least a processor(s) 110, a memory (ies) 112, a transmitter(s) 114, and an accelerometer(s) 116. All of the foregoing are communicatively coupled via a local interface(s) 118.

In terms of hardware, the memory 112 comprises all volatile and non-volatile memory elements, including but not limited to, RAM, ROM, etc. In terms of software, the memory 112 comprises at least the following software: an operating system (O/S) 111, the MAI system 101, and the AD system 102. The computer program code (instructions) associated with the software in memory 112 is executed by the processor 110 in order to perform the methodologies of the present disclosure.

The MAI system 101 and/or the AD system 102 (as well as the other software and software logic described in this document), which comprises an ordered listing of executable instructions for implementing logical functions, can be embodied in any non-transitory computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable medium" can be any means that can contain or store the program for use by or in connection with the instruction execution system, apparatus, or device. The non-transitory computer readable medium can be, for example but not limited to, an electronic, magnetic, optical, electromagnetic, infrared, or semiconductor system, apparatus, or device. More specific examples (a non-exhaustive list) of the non-transitory computer-readable medium would include the following: a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) or DVD (optical).

The transmitter (TX) 114 may be part of a transceiver (TX/RX) that has both a transmitter and a receiver. In either case, the transmitter is connected to an antenna(s) for transmitting accelerometer information, MTMA information, and/or action determination information, depending upon the implementation.

Optionally, the WCD 104 may be equipped with a user input device(s), a user output device, or a combination thereof, denoted by I/O device(s) 120. For example, the WCD 104 may be equipped with a keyboard (soft or hard), a display, etc.

The accelerometer 116 can be one that is designed to output data with respect to one, two, or three axes, depending upon the MTMAs to be identified. In the preferred embodiment, the accelerometer 116 produces acceleration data with respect to three axes (arbitrarily identified by an x, y, z coordinate system).

F. ACCELEROMETER OUTPUT DATA STRUCTURE

FIG. 3 is an example of an output data structure from the three-axis accelerometer 116 that can be employed as one of the sensors of FIG. 2D. The accelerometer 116 can be a commercially available MEMS device. As shown in FIG. 3, the accelerometer output data 120 includes a time stamp value 121, an acceleration value 122 along an x-axis, an acceleration value 123 along a y-axis, and an acceleration 124 along a z-axis. The x, y, and z axes are orthogonal. Acceleration in connection with an axis is equal to the rate of change of velocity along the axis. Furthermore, in one embodiment, among others, each of the values 121-124 is six digits, and 60 data sets 120 are acquired each second, until 256 data points (equivalent of 4.27 seconds) are collected. In this embodiment, this is sufficient to accurately identify the MTMA 105 for this time period.

In some embodiments, it would be possible to determine the MTMA 105 with an accelerometer 116 that produces acceleration data along one axis. For example, if the only relevant MTMAs are standing and moving, then identification could be accomplished with such an accelerometer 116. Furthermore, the data only need be analyzed in the time domain to make the identification.

G. MAI SYSTEM

1. First Set of Embodiments

Figure 4A:
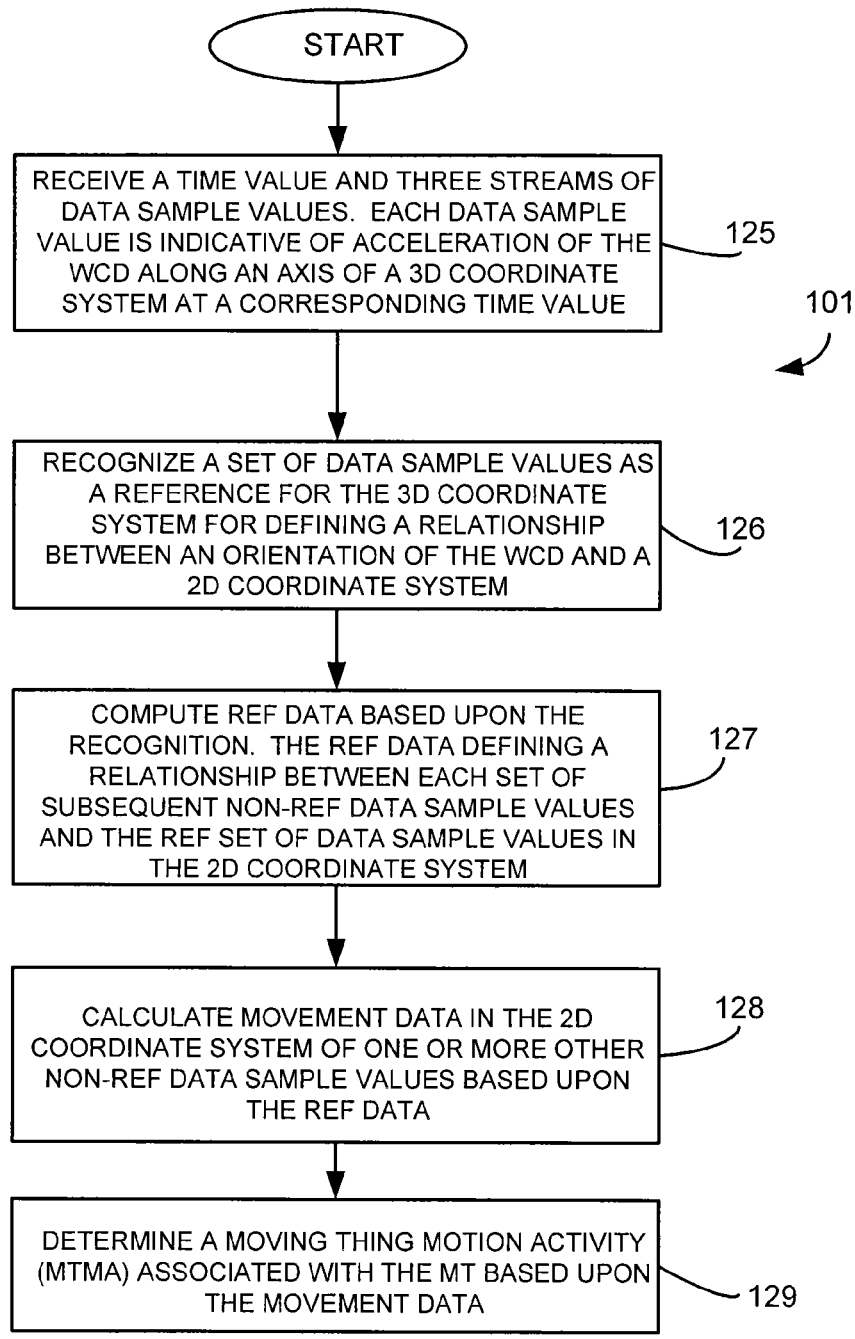
FIG. 4A is a flowchart of an example of a first set of embodiments of the MAI system of FIG. 2D.

FIG. 4A is a flowchart of an example of a first set of embodiments of the MAI system 101 of FIG. 2D. In these embodiments, as shown in FIG. 4A, the MAI system 101 includes at least the following program code (or logic): program code 125 that receives a time value 121 (FIG. 3) and three streams of data sample values 122, 123, 124 (FIG. 3) from the accelerometer 116 (FIG. 2D) of the WCD 104 that is transported by the MT 104, each data sample value 122, 123, 124 indicative of acceleration of the WCD 104 along an axis of a three dimensional (3D) coordinate system at a corresponding time value 121; program code 126 that recognizes a particular set (vector) of data sample values as a reference in the 3D coordinate system for defining a relationship between an orientation of the WCD 104 and a two dimensional (2D) coordinate system; program code 127 that computes reference data (e.g., a rotation matrix) based upon the recognition of the particular set, the reference data defining a relationship between each set of subsequent non-reference data sample values and the particular reference set of data sample values in the 2D coordinate system; program code 128 that calculates movement data in the 2D coordinate system of one or more other non-reference data sample values based upon the reference data; and program code 129 that determines the MTMA 105 associated with the MT 104 based upon analyzing the movement data.

In some embodiments, the program code 126 identifies the reference set 120 (FIG. 3) as the set 120 of data sample values that when treated as a 3D vector and mathematically combined to compute the magnitude, results in a resultant magnitude value that is indicative of a relationship to Earth gravity, e.g., the resultant magnitude value is equal to one within a predefined range of error (e.g., the range of 1+0.02 and 1−0.02). In essence, this set 120 of acceleration values is recognized as a vector pointing toward Earth gravity. Reference data (e.g., a rotation matrix) is computed based upon this Earth gravity vector in 3D space so that data sample values can be analyzed in 2D space. Said another way, a vector pointing toward Earth gravity is aligned with the z-axis. So, the two dimensions in space that are defined are the z-axis and the x-y plane for MTMA analysis and identification. As will be further discussed in this document, magnitudes of the data sample values are determined in the two dimensions of space and then statistical metrics are computed based upon the magnitudes, in the time and frequency domains.

Furthermore, in the preferred embodiment, the reference data is updated each time the particular reference set 120 of data samples 121, 122, 123, 124 is recognized. This could be performed less frequently, if desired, depending upon the implementation.

In the preferred embodiments, the reference data is a rotation matrix that rotates new data so that the data is normalized in the 2D space. However, in some embodiments, the reference data can be represented by vector information that is different than a rotation matrix. For example, obtaining reference data from a different sensor, such as a gyroscope. Alternatively, the orientation can be represented by determining an angle of the motion of WCD 104 with respect to gravity or a prescribed direction/orientation.

In some embodiments, the program code 128 that generates the movement data may be designed to generate the movement data in the form of a vertical magnitude along the z axis and a horizontal magnitude in the x, y plane, both derived from a rotated vector, the rotated vector equal to the rotation matrix M multiplied by the vector associated with the other non-reference data sample values (x, y, z). Furthermore, the program code 128 may be designed to transform the movement data to the frequency domain (FD) to produce FD data and to compute one or more FD statistical metrics from the FD data, so that the program code 129 can identify the MTMA 105 is based at least in part upon the FD statistical metrics.

In some embodiments, the MTMA 105 may be identified from a set of known MTMAs 105. In these embodiments, the program code 129 can perform a comparative analysis in order to help determine the MTMA 105. As an example, the program code 129 may be designed to compute a score for each MTMA 105 of the known set and to compare the scores to accurately identify the MTMA 105.

2. Second Set of Embodiments

Figures 4B, 4C:
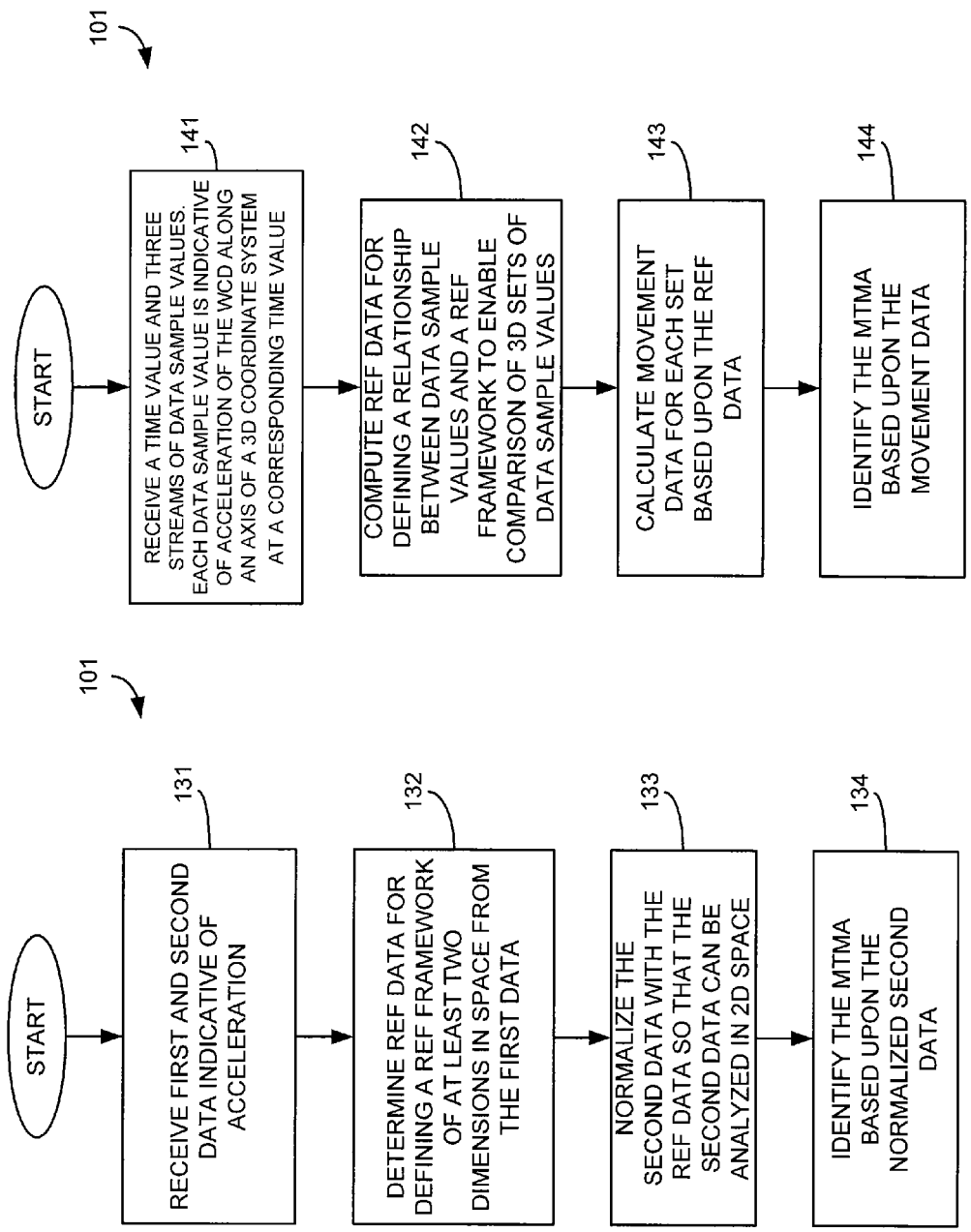
FIG. 4B is a flowchart of an example of a second set of embodiments of the MAI system of FIG. 2D.
FIG. 4C is a flowchart of an example of a third set of embodiments of the MAI system of FIG. 2D.

FIG. 4B is a flowchart of an example of a second set of embodiments of the MAI system 101 of FIG. 2D. In these embodiments, as shown in FIG. 4B, the MAI system 101 includes at least the following program code (or logic): program code 131 designed to receive first and second data indicative of acceleration of the WCD 104; program code 132 designed to determine reference data (e.g., a rotation matrix) for defining a reference framework in two dimensions (2D) of space from the first data; program code 133 designed to normalize (e.g., rotating) the second data with the reference data so that the second data can be analyzed in the 2D space; and program code 134 designed to identify the MTMA 105 based upon the normalized second data. The second data may comprise a series of periodic sets 120 of data values.

In the preferred embodiment, the first data is the data structure 120 (FIG. 3) having a combined magnitude equal to one within a predefined range of error (i.e., the range of 1+0.02 and 1−0.02). Moreover, the reference data is preferably a rotation matrix that is frequently updated and that is used to normalize second data samples so that all samples are aligned with Earth gravity and can be more accurately analyzed in 2D space. However, as previously described, in some embodiments, the reference data can be represented by vector information that is different than a rotation matrix.

In some embodiments, including the preferred embodiment, the program code 133 and/or the program code 134 may be designed to calculate a vertical magnitude along the z-axis and a horizontal magnitude in the x-y plane in the time domain, and may be designed to statistically analyze these values to assist in identifying the most probable MTMA 105. The time domain values that can be analyzed, among others, are as follows: an average magnitude along the z-axis, a SD of the z-axis magnitude, an average magnitude in the x-y plane, and a SD of the x-y plane magnitude.

In some embodiments, including the preferred embodiment, the program code 133 and/or the program code 134 may be designed to transform the normalized second data from time domain data to frequency domain data using FT, and may be designed to analyze the frequency domain data along with the time domain data in order to accurately identify the MTMA 105.

In some embodiments, the MTMA 105 may be identified from a set of known MTMAs 105. In these embodiments, the program code 134 can perform a comparative analysis in order to help determine the MTMA 105. As an example, the program code 133 and/or program code 134 may be designed to compute a score for each MTMA 105 of the known set and to compare the scores to accurately identify the MTMA 105.

3. Third Set of Embodiments

FIG. 4C is a flowchart of an example of a third set of embodiments of the MAI system 101 of FIG. 2D. In these embodiments, as shown in FIG. 4C, the MAI system 101 includes at least the following program code (or logic): program code 141 designed to receive a time value and three streams of data sample values from the accelerometer 116 of the WCD 104 that is transported by the MT 106, each data sample value indicative of an acceleration of the WCD 104 along an axis of a three dimensional (3D) coordinate system at a corresponding time value; program code 142 designed to compute reference data, the reference data defining a relationship between data sample values and a reference framework to enable comparison of 3D sets 120 of data sample values; program code 143 designed to calculate movement data for each set 120 based upon the reference data; and program code 144 designed to determine the MTMA 105 associated with the MT 106 based upon the movement data.

In some embodiments, the program code 142 identifies the reference set 120 (FIG. 3) as the set 120 of data sample values that when treated as a 3D vector and mathematically combined to compute the magnitude, results in a resultant magnitude value that is indicative of a relationship to Earth gravity, e.g., the resultant magnitude value is equal to one within a predefined range of error (e.g., the range of 1+0.02 and 1−0.02. However, as previously described, in some embodiments, the reference data can be represented by vector information that is different than a rotation matrix.

Furthermore, in the preferred embodiment, the reference data is updated by the program code 142 each time the particular reference set 120 of data samples 121, 122, 123, 124 is recognized. This could be performed less frequently, if desired, depending upon the implementation.

In some embodiments, the program code 143 that generates the movement data may be designed to generate the movement data in the form of a vertical magnitude along the z axis and a horizontal magnitude in the x, y plane, both derived from a rotated vector, the rotated vector equal to the rotation matrix M multiplied by the vector associated with the other non-reference data sample values (x, y, z). Furthermore, the program code 143 may be designed to transform the movement data to the frequency domain (FD) to produce FD data and to compute one or more FD statistical metrics from the FD data, so that the program code 144 can identify the MTMA 105 is based at least in part upon the FD statistical metrics.

In some embodiments, the MTMA 105 may be identified from a set of known MTMAs 105. In these embodiments, the program code 143 and/or program code 144 can be designed to perform a comparative analysis in order to help determine the MTMA 105. As an example, the program code 143 and/or the program code 144 may be designed to compute a score for each MTMA 105 of the known set and to compare the scores so that the program code 144 can accurately identify the MTMA 105.

4. Fourth Set of Embodiments

Figure 7:
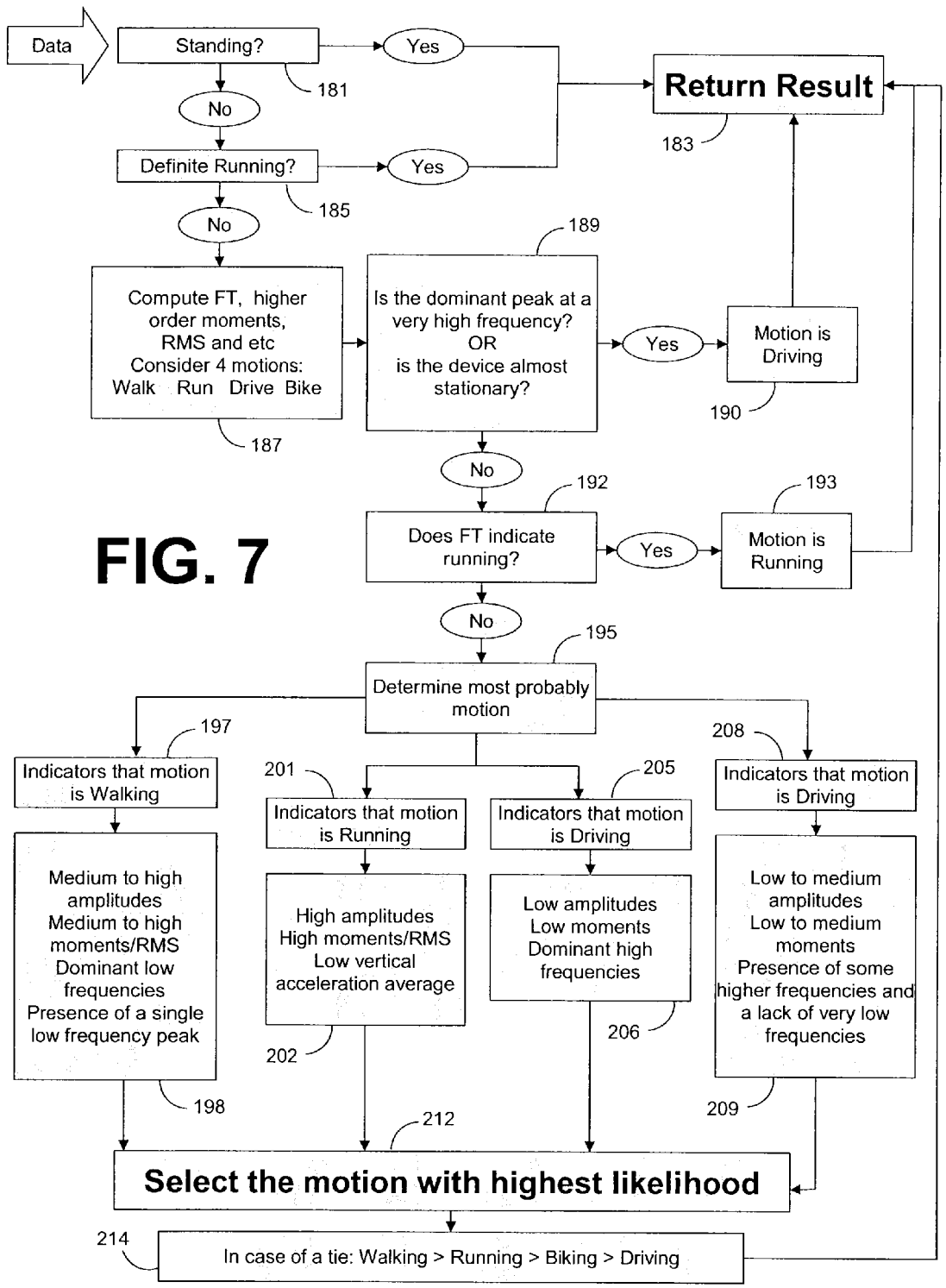
FIG. 7 is a flowchart showing an example of a fourth set of embodiments of the MAI system of FIG. 2D, wherein the MAI system is used to identify a most probable MTMA from a set of 5 MTMAs, including (1) standing, (2) walking, (3) running, (4) biking, and (5) driving (including travel in a motorized vehicle, such as, but not limited to taking a public transit or being a passenger in a vehicle).

A fourth set of embodiments of the MAI system 101, which is the preferred set, will now be described with reference to FIGS. 5-7. A normalization process (rotation of coordinate system will be described with respect to FIG. 5. Some statistical parameters that are used in the analysis will be described in connection with FIG. 6. Furthermore, FIG. 7 is a flowchart showing an example of the third set of embodiments of the MAI system of FIG. 2D, wherein the MAI system is used to identify a most probable MTMA from a set of 5 MTMAs, including (1) standing, (2) walking, (3) running, (4) biking, and (5) driving.

a. Rotation of the Axes

FIG. 5 is an example of a methodology that can be used by the MAI system 101 to establish a reference framework in two dimensions of space (essentially a cylindrical coordinate system, wherein the reference framework enables normalization of sampled data so that sampled data can be intelligently compared. As shown in FIG. 5, the process for rotating the coordinate system with respect to gravity is as follows in the preferred embodiment:

1. Earth gravity has net magnitude of 1, and the direction is always downward.
2. Earth gravity is always present, so if the net acceleration magnitude is not 1, then the other forces are present in the system (motion of the body).
3. If the net acceleration magnitude is detected to be 1, then only gravity is felt at that point and, therefore, the direction of the vector is the downward direction.
4. These, effectively stationary, points can be found by selecting data points with magnitude sufficiently close to 1. For example, within $\delta=0.02$ of one. Use this direction of this vector as the positive z-axis.
5. Experimentally, these points are found 3-6 times per second, in the preferred embodiment. Thus, even if a point is falsely classified as stationary, the MAI system 101 will quickly self-correct.
6. Compute the rotation matrix which will rotate the position of this reference point (x, y, z) to be on the positive z-axis, point (0,0,1).
7. This rotation matrix is determined in two steps: (1) Rotate about the x-axis so that the y-coordinate is zero; and (2) Rotate about the y-axis so that the x-coordinate is zero.
8. The two steps can be done in reverse to obtain a different rotation matrix, which would still orient the vector along positive z-axis.
9. For the subsequent points which are not within $\delta$ of one, the same rotation matrix is used, since the WCD 104 cannot significantly change orientation that frequently.
10. There is more than one unique matrix which ensures that the gravity is oriented along the vertical axis (positive or negative direction).
11. The x and y coordinates of non-stationary points would be different depending on how the rotation is performed.
12. The magnitude of the net horizontal acceleration will be the same regardless of which matrix that is used.
13. The vector may also be rotated about the z-axis in the xy-plane. In some embodiments, this may rely on data from gyroscope, compass, etc.
14. When the next point within $\delta$ of one is reached, a new rotation matrix is generated.

15. The old rotation matrix is updated.

An example of a vector used to determine gravity is as follows:

$$V_{start}=(0.3, 0.8, 0.52)$$

Since $\sqrt{0.3^2+0.8^2+0.52^2}=\sqrt{1.0004}\approx 1.0002$ is within 0.02 of 1, then the vector is rotated to be oriented along the positive vertical axis:

$$V_{rot}=(0,0,1.0002)$$

And a matrix M is created so that:

$$V_{rot}=MV_{start}$$

After rotation, the other two coordinates x, y are 0 (or on the order of machine epsilon, depending on how the rotation is implemented). Current C++ code merely sets them to be zero, but with a MATLAB implementation, which actually does the matrix multiplication, the x, y coordinate are on the order of 1e-16 due to internal rounding errors.

This matrix M is then used to rotate the subsequent data points until a new matrix is found. It is also possible for the number of the subsequent points using this matrix M to be as little as zero if there are two consecutive stationary points, but typically, approximately 10-20 points are rotated before the matrix is updated.

b. Statistical Parameters

FIG. 6 is a description of statistical parameters in the time domain and the frequency domain that can be utilized by the MAI system of FIG. 2D to identify a most probable MTMA.

i. Basic Parameters

With reference to FIG. 6, the basic parameters that are used by the MAI system 101 in the time domain are as follows:

1. Average, mean, and/or median of the data set. These are a measure of where the data is centered.

2. SD and/or variance. These are a measure of how wide the data is distributed.

3. The foregoing parameters can be calculated from the whole interval or a partial interval. For example, an average of the first half of data points or an average of only one (or more) components can be computed and used in the analysis.

4. The MAI system 101 can also calculate average/variance of sets of points selected from the data, such as the average of peak values. Also, the MAI system 101 can average several data intervals over a prolonged period of time.

5. Averaging and variance alone can obtain a certain degree of accuracy, requiring very little computation time and in some cases are sufficient.

6. It is possible to apply these basic methods without rotating the data.

7. After certain accuracy is obtained with average and variance alone, it is very difficult to improve it without resorting to more sophisticated methods.

ii. Advanced Parameters

With reference to FIG. 6, the advanced parameters that are used by the MAI system 101 in the time domain are as follows:

1. Higher order moments, calculated about mean, zero, and/or other value. An example of a higher order moment, say $4^{th}$ order moment about its mean, is proportional to:

$$\sum_{i=1}^{n}(v_i-\mu)^4$$

Where n is the number of data points, $v_1$ to $v_n$ are the data values and $\mu$ is the mean.

2. Root mean square (RMS; also can be used as an alternative to SD) or generalized mean.

3. Signal magnitude area, that is, the area encompassed by the magnitude of the signal.

iii. Fourier Transform (FT)

With reference to FIG. 6, the parameters that are analyzed by the MAI system 101 in the frequency domain are as follows:

1. The MAI system 101 identifies the peaks, which give the amplitude and frequency of all the oscillatory motions present in the data.

2. The human motion activity, such as walking or running, tends to have lower frequencies and motion activity with a transport (car, bike, etc.) has higher frequencies. Thus, the above techniques (averaging, computing RMS, etc.) are applied in higher and lower frequency regions to compare their strength.

c. Architecture/Operation

FIG. 7 is a flowchart showing an example of the architecture and operation of the third set of embodiments of the MAI system of FIG. 2D, wherein the MAI system is used to identify a most probable MTMA from a set of 5 MTMAs, including (1) standing, (2) walking, (3) running, (4) biking, and (5) driving. This set of embodiments is essentially an even more specific version of the first set of embodiments (FIG. 4A).

i. Analysis for Stationary (Stopped, Standing)

With reference to FIG. 7, as shown at block 181, a determination is made by the logic as to whether the WCD 104 is stationary (stopped, standing). FIG. 8 illustrates the process that is utilized to make this determination, as follows:

1. The SD is sufficiently low (one possible threshold used is less than 0.015 for horizontal acceleration and less than 0.02 for vertical acceleration).

2. Horizontal acceleration is on average sufficiently close to zero (for example, within 0.05 of 0) and vertical acceleration is on average sufficiently close to one (for example, within 0.05 of 1).

3. Other parameters, such as higher order moments, RMS, etc, can also be used to predict when WCD 104 is stationary.

4. Typically, average and SD are sufficient to identify when the WCD 104 is not moving and methods with higher computation costs are not required, although they could be used.

5. Identifying a stationary WCD 104 would not require rotation of the axis.

When a determination is made that the WCD 104 is stationary, then the MAI system 101 will return this as the result, as indicated by block 183 of FIG. 7. However, when a determination is made that the WCD 104 is not stationary, then the MAI system 101 will attempt to determine if the MT 106 associated with the WCD 104 is running, as shown at block 185.

ii. Analysis for Running (First Time)

As shown in FIG. 8, the analysis performed at block 185 is as follows:

1. During running, the user is often in a state of free fall with strong impact every time a step it taken. This results in significantly lower averages than other motion activities.

2. Strong impact during running also results in larger change in velocity. Thus, the running motion activity has a significantly higher SD.

3. One possible embodiment is taking the vertical average less than 0.62 and the vertical SD higher than 0.5, then the MTMA 105 can be identified as running and not walking/driving or biking.

4. This does not identify all of the running motion activities but about 65% of the test group data.

When a determination is made that the WCD 104 is running, then the MAI system 101 will return this as the result, as indicated by block 183 of FIG. 7. However, when a determination is made that it cannot be concluded with sufficient probability that the MT 106 associated with the WCD 104 is running, then the MAI system 101 will transform the horizontal and vertical magnitudes from the time domain to the frequency domain using the FT, as shown at block 187, so that all 4 motion activities can be considered.

iii. Analysis for Driving (First Time)

At this point, the MAI system 101 will attempt to determine if the MTMA 105 is driving with the analysis set forth in block 189 of FIG. 7. A first inquiry is made as to whether the dominant peak is at a very high frequency. If so, then the MAI system 101 concludes that the MTMA 105 is driving, as indicated at block 190 and the result or a variant thereof is communicated to the action determination system 102, as indicated by block 183. If not, then the MAI system 101 will make a second inquiry.

The second inquiry involves determining if the WCD 104 is almost stationary. This is accomplished by identifying low SD in both vertical and horizontal directions, identifying on average a sufficiently small horizontal acceleration and determining that FT shows no peaks or peaks with very low amplitude. If so, then the MAI system 101 concludes that the MTMA 105 is driving, as indicated at block 190, and the result or a variant thereof is communicated to the action determination system 102, as indicated by block 183.

iv. Analysis for Running (Second Time)

If not, then the logic of the MTMA system 101 makes a determination as to whether the frequency domain magnitudes indicate running, as indicated by block 192. This is accomplished by identifying a low frequency peak with sufficiently high amplitude. If so, then the MAI system 101 concludes that the MTMA 105 is running, as indicated by block 193, and the result or a variant thereof is communicated to the action determination system 102, as indicated by block 183.

If not, then the logic of the MTMA system 101 will attempt to determine the MTMA 105 with comparative analysis, as is shown by block 195. Parameters that are considered for walking are indicated at blocks 197, 198. Parameters that are considered for running are indicated at blocks 201, 202. Parameters that are considered for driving are indicated at blocks 205, 206. Parameters that are considered for biking are indicated at blocks 208, 209. As indicated by block 212 in FIG. 7, the MTMA 105 with the highest likelihood is ultimately selected. If there is a tie in terms of scores or probabilities, then the following preference scheme is used in the preferred embodiment, as is shown at block 214: walking is selected over running, biking, and driving; running is selected over biking and driving; and biking is selected over driving. This hierarchy is based on the experimental test group for the five motions and may be different when the number of motions is increased. Finally, the result of the comparative analysis is reported by the MAI system 101 to the AD system 102, as indicated at block 183.

v. Identifying Most Probable MTMA with Comparative Analysis

FIG. 9 shows the methodology that the MAI system 101 utilizes for identifying a most probable MTMA 105 based upon a comparative analysis (comparing probabilities). Previously, the MAI system 101 attempted to identify cases of the WCD 104 being stationary based on average and SD. If the WCD 104 is involved in a motion activity, then the MAI system 101 checks if the MT 106 is running based on low average and high SD. If the vertical average is higher than 0.6, and the data was not identified as stationary, then the motion activity could be walking, running, driving, or biking. So, Fourier transforms of the acceleration components and several higher order moments were computed and the data will now be analyzed, as follows.

1. Calculate the previously mentioned values of higher order moments, averages of higher frequencies, FT, etc.

2. Define the starting likelihood counter for each of the 4 motion activities as 0.

3. Examine every calculated parameter and adjust the likelihood of each motion, accordingly. For example, if there is a peak with high amplitude at a low frequency the likelihood of running should be increased and of driving decreased.

4. After all the cases are examined; the highest counter indicates the most probable motion activity.

5. In a case where there are two or more highest counters, the preference is given to motion activity that is historically more likely to appear in a tie. For example, between biking and walking the preference is given to walking.

6. Also, if two highest counters are very close to each other, the result can be treated as conditional until later data confirms the motion activity.

7. If the vertical average is less than 0.6, but the SD does not support the motion activity as running, then the MTMA 105 is not one of standing, walking, running, driving or walking. This result may happen when the device is dropped, picked up, or the user made a sudden motion while in possession of device. Sudden movements as such may affect the average but since they are not repetitive, they will not significantly increase SD or significantly affect the FT. This case is rare and identified as none of the 5 motions.

The methodology employed in 195 computes the likelihood of each motion based on comparing each parameter value to a set of threshold values. For example, high standard deviation significantly increases the likelihood that MTMA is running, somewhat increases the likelihood that MTMA is walking, decreases the likelihood of biking and significantly decreases the likelihood of driving. Once all the parameters are compared, the result is four numbers, which may be positive or negative, indicating the likelihood of each motion, from which the MTMA is identified.

It is possible to compute a confidence value for the identified MTMA based on how close the four likelihood counters are. One possible non-unique implementation of this is to calculate the differences between the counters and the value one below the lowest counter. Then compute the percentages of each difference out of the total. For example, if the counters for walking, running, driving and biking are 4, 3, −2 and 7 respectively, then MTMA is identified as biking, and then the confidence percentage can be computed as follow.

Total difference: (4−(−3))+(3−(−3))+(−2−(−3))+(7−(−3))=7+6+1+10=24

Percentage Walking: 4/24=16.7%
Percentage Running: 1/24=12.5%
Percentage Driving: 1/24=4.2%
Percentage Biking: 10/24=41.7%
The percentage values can be used to determine confidence of the MTMA identification. If the certainty is insufficiently high, the result can be treated as conditional until the subsequent data confirms the MTMA.

The aforementioned cases of stopped (181), running (185, 192) and driving (189) could be identified from the MTMA comparative analysis as well. The purpose of examining the cases earlier is to save on computational cost and time. If the complexity of the algorithm is changed/adjusted to accommodate new types of motion, it is likely those cases will be subject to change.

vi. Analysis for Walking (First Time)

FIG. 10A illustrates the methodology and parameters in the time domain and frequency domain that can be used by the MAI system 101 to analyze whether the MTMA 105 is walking.

FIG. 10B is an example of time domain and frequency domain graphs, in connection with walking, that shows an example of each of the following (left to right, top then bottom): (1) acceleration versus time along the vertical axis (z-axis) of the reference coordinated system over a time period, (2) acceleration versus time in the horizontal plane (x-y plane) of the reference coordinate system over the same time period, (3) amplitude versus frequency along the vertical axis (z-axis) of the reference coordinate system over the same time period, (4) amplitude versus frequency in the horizontal plane (x-y plane) of the reference coordinate system over the same time period.

Overall, walking can be characterized by dominant low frequency motion activities and low frequency peaks.

One example of the methodology, as shown in FIG. 10A, is as follows:

1. If $3^{rd}$ order moment of horizontal acceleration about zero is above a certain threshold, reduce walking likelihood by one.

2. If the average of FT is significantly higher than the average higher frequency, then increase the likelihood of walking.

3. If RMS of the net acceleration vector is sufficiently high, then increase likelihood of walking accordingly.

4. If $4^{th}$ order moment about zero is too low, reduce the likelihood of walking and if the moment is sufficiently high, increase it.

5. If FT only shows motions with very low amplitude and there is very little motion, and low SD (a case resembling standing), then reduce likelihood of walking by two.

6. If RMS of the vertical acceleration is above a certain threshold, then reduce likelihood of walking accordingly.

7. If there are no peaks present in FT, reduce likelihood of walking.

8. If the highest peak is at a slightly higher frequency and has amplitude sufficiently low amplitude, reduce likelihood of walking.

9. If there is a prominent peak at low frequency, then increase the likelihood of walking.

vii. Analysis for Running (Third Time)

FIG. 11A illustrates the methodology and parameters in the time domain and frequency domain that can be used by the MAI system 101 to analyze running.

FIG. 11B is an example of time domain and frequency domain graphs, in connection with running, that shows an example of each of the following (left to right, top then bottom): (1) acceleration versus time along the vertical axis (z-axis) of the reference coordinated system over a time period, (2) acceleration versus time in the horizontal plane (x-y plane) of the reference coordinate system over the same time period, (3) amplitude versus frequency along the vertical axis (z-axis) of the reference coordinate system over the same time period, (4) amplitude versus frequency in the horizontal plane (x-y plane) of the reference coordinate system over the same time period.

One example of the methodology, as shown in FIG. 11A, is as follows:

1. About 65% of running can be identified based on average and SD alone.

2. Running is still a possible motion activity if the average is high.

3. If there is presence of high amplitude at a low frequency and the average vertical acceleration is still less than one, then the motion is identified as running and analysis terminated (192).

4. If the average of FT is less than twice the average higher frequency, then reduce the likelihood of running. If it is greater than 2.5 times the higher frequency, then increase the likelihood slightly.

5. If the SDs (both vertical and horizontal) are significantly high, then increase the likelihood of running.

6. If the 4th order moment of the vertical acceleration about zero is above two, increase the likelihood by one.

7. If there is very little activity (low SD, lack of peaks in the Fourier transform) then running is almost certainly not the motion activity.

8. If the RMS of the vertical acceleration about zero is sufficiently high, increase the likelihood of running.

viii. Analysis for Driving (Second Time)

FIG. 12A is a description of methodology and parameters in the time domain and frequency domain that can be used by the MAI system 101 to analyze driving.

FIG. 12B is an example of time domain and frequency domain graphs, in connection with driving, that shows an example of each of the following (left to right, top then bottom): (1) acceleration versus time along the vertical axis (z-axis) of the reference coordinated system over a time period, (2) acceleration versus time in the horizontal plane (x-y plane) of the reference coordinate system over the same time period, (3) amplitude versus frequency along the vertical axis (z-axis) of the reference coordinate system over the same time period, (4) amplitude versus frequency in the horizontal plane (x-y plane) of the reference coordinate system over the same time period.

One example of the methodology, as shown in FIG. 12A, is as follows:

1. If 3rd order moments of horizontal and vertical accelerations about zero are sufficiently high, then reduce driving likelihood.

2. If 3rd order moment of horizontal acceleration about its mean is above a certain threshold, reduce driving likelihood.

3. If the average of FT is less than twice the average higher frequency, then increase the likelihood of driving (amount of increase depends on how significant the difference is).

4. If the average of FT is significantly higher than the average of higher frequency, then reduce likelihood of driving.

5. If SD (for both vertical and horizontal accelerations) is significantly high, reduce the likelihood of driving.

6. If RMS of the net acceleration vector is large, then reduce likelihood of driving accordingly.

7. If 4th order moment about zero is small enough, increase the likelihood of driving and if the moment is large, reduce it.

8. If FT only shows motions with very low amplitude, and there is very little motion, low SD (a case resembling standing), then increase driving likelihood significantly.

9. If the highest amplitude present is at a very high frequency, then the motion activity should be driving and method can be terminated with results returned (189).

10. A singular peak tends to correspond to the motion activity of biking and in order to reduce the false biking identification during driving, if that singular has relatively low amplitude, then increase likelihood of driving as well.

11. If the highest peak has low amplitude or there are no peaks found, then increase likelihood of driving by 1.

12. Driving can be characterized by limited motion, presence (or dominance) of high frequencies.

ix. Analysis for Biking (First Time)

FIG. 13A is a description of parameters/methodology in the time domain and frequency domain that can be used by the MAI system of FIG. 2D to analyze biking.

FIG. 13B is an example of time domain and frequency domain graphs, in connection with biking, that shows an example of each of the following (left to right, top then bottom): (1) acceleration versus time along the vertical axis (z-axis) of the reference coordinated system over a time period, (2) acceleration versus time in the horizontal plane (x-y plane) of the reference coordinate system over the same time period, (3) amplitude versus frequency along the vertical axis (z-axis) of the reference coordinate system over the same time period, (4) amplitude versus frequency in the horizontal plane (x-y plane) of the reference coordinate system over the same time period.

One example of the methodology, as shown in FIG. 13A, is as follows:

1. If the average of FT is less than 2.5 times the average higher frequency, then increase the likelihood of biking (amount of increase depends on how significant the difference is).

2. If RMS of the net acceleration vector is above a certain threshold, then reduce likelihood of biking.

3. If the horizontal SD is significantly high, then reduce the likelihood of biking.

4. If the 4th order moment of vertical acceleration about zero is less than a certain threshold, increase the likelihood of biking.

5. If the RMS of the vertical acceleration is sufficiently small, increase the likelihood of biking, and if it is sufficiently high, reduce it.

6. If the peaks are of low to medium amplitude and is at a sufficiently high frequency, increase likelihood of biking.

7. If FT analysis yields a singular peak, much more dominant than the rest, increase likelihood of biking.

H. ACTION DETERMINATION SYSTEM

Once the MTMA 105 is identified and the pertinent information communicated to the AD system 102 by the MAI system 101, the AD system 102 can take any appropriate intelligent activity based action. In some embodiments, the AD system 102 can implement one or more algorithms 115 (FIG. 2D) in order to determine an appropriate action.

A history of MTMAs 105 may be recorded or a specific function may be performed based on the identified MTMA 105.

The AD system 102 may be designed to store statistics of the MTMAs 105 over a prolonged period of time and provide the statistics or a derivative thereof to a user. For example, the user can be provided with a listing of the percentage of time spent walking or running during a day. These percentages can be computed from simple algorithms 115.

If the MTMA 105 is a form of exercise or entertainment, then the AD system 102 of the WCD 104 may be designed to turn on an audio file, such as music. If the MTMA 105 stops, for example, if the WCD 104 user stops during a jog or a bike ride, the AD system 102 could be designed to pause or turn down the volume of the audio file. The AD system 102 may also be designed to play different audio based on what MTMA 105 is identified. For example, the user may have different playlists for jogging and for bike rides.

The knowledge a user's performed MTMAs 105 can be used to analyze a user's daily patterns and report any anomalies. For example, if the user is known to take the bus/drive to work at a specific time every weekday, then if the user oversleeps, the AD system 102 can be designed to cause the WCD 104 to sound an alarm.

Studying the user's daily/weekly/monthly habits can provide information for more effective advertising. A person who regularly jogs may be pushed advertisements for running shoes. Also, a user can be alerted in the event of health related problems determined by the studies.

Other actions that can be initiated and other algorithms 115 for determining what action to take are described in the following copending applications: SYSTEMS AND METHODS FOR DETERMINING MOBILE THING MOTION ACTIVITY (MTMA) USING SENSOR DATA OF WIRELESS COMMUNICATION DEVICE (WCD) AND INITIATING ACTIVITY-BASED ACTIONS, having 61/695001, filed on even date herewith; and NOTIFICATION SYSTEMS AND METHODS THAT EMPLOY ACTIVITY DETECTION, having 61/695044, filed on even date herewith, which are all incorporated herein by reference in their entireties.

I. VARIATIONS, MODIFICATIONS, AND OTHER POSSIBLE APPLICATIONS

It should be emphasized that the above-described embodiments of the present invention, particularly, any "preferred" embodiments, are merely possible nonlimiting examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention.

With respect to variations, note that although one or more elements of one embodiment may not be described in connection with another, the elements can typically be employed in the other embodiment.

As another example of a variation, the calculations for identifying the MTMA may rely on the raw readings from the accelerometer along the three axes or the combined net acceleration in the horizontal direction, or total net acceleration. That is, the data may be manipulated into a different form, such as rotation about the axes (similar to gyroscope data).

As another example of a variation, in some embodiments, the MTMA 105 may be identified without the normalization process of the present disclosure with a one axis, two axis, or three axis accelerometer. As a nonlimiting example, if the MTMAs 105 to be identified are standing and moving, this can be determined from analyzing the raw accelerometer data without rotating or otherwise normalizing the data by merely reviewing the data for a change, which would indicate movement and a non-change, which would indicate standing. However, as more MTMAs 105 are added to the list of those that need to be identified, the normalization process of the present disclosure becomes more desirable because it enables more accurate analysis of acceleration data and therefore MTMA identification.

As another example of a variation, while FT is the most common transform used in signal processing, other transforms are possible and could be utilized in connection with identifying MTMAs 105, for example, Laplace Transforms, Mellin Transforms, other integral transforms, etc. The data may also be transformed by taking the logarithm of either one or both of dependent and independent variables.

As another example of a variation, methods studying the numerically computed derivatives may also be implemented, for instance, studying the phase space and Bode plots.

As another example of a variation, currently, the implementation relies on computing higher order moments. This may be further extended to a moment generating function or a probability density function.

Furthermore, the transformation of data may be linear, non-linear, in Cartesian or non-Cartesian coordinates.

J. APPENDIX

The following is a nonlimiting example of source code (in Python code) that can be employed to implement the fourth set of embodiments of the MAI system of FIG. 7 in order to identify a most probable MTMA 105.

```
from numpy import *
from scipy import *
import scipy as Sci
import scipy.linalg
import sys
import time
def approxMotion(file, mtn, ran, output):
    bolMot=array([0, 0.0, 0.0, 0.0, 0.0, 0.0]);
    T=[ ]; hX=[ ]; hY=[ ]; hZ=[ ];
    f=open(file);
    lines=f.readlines( )
    for line in lines:
    items=str.split(line)
    T.append(float(items[0])); hY.append(float(items[2]));
    hX.append(float(items[1])); hZ.append(float(items[3]));
    f.close( )
    percentages=[0.0, 0.0, 0.0, 0.0];
    n=256; #length of data sample
    upd=256; #number of points shifted by
    s1=60*15−1; f1=s1+n; #omit the first 15 sec, set strt/fin of 1st
sample
    nmax=int(floor((len(hZ)−f1)/upd)+1);
    m=0
    correct=0; #DEBUG number of correctly identified points
    mTotal=0; #DEBUG tracking variable
    for k in range(0, nmax):
    timeR=T[s1:f1]; t=timeR[0];
    timeR=[x−t for x in timeR];
    hR=hZ[s1:f1];
    sR=[x**2+y**2 for x,y in zip(hX[s1:f1],hY[s1:f1])];
    sR=[sqrt(x) for x in sR];
    ret=findMotion(hR, sR, timeR, ran);
    m=ret[0];
    if output==1:
        print(file+' Time: '+str(T[s1])+' to '+str(T[f1])+'
        Motion is '+str(m));
    mTotal=mTotal+m/nmax;
    if ran==0:
        print ("%.2f" % ret[1]+' '+"%.2f" % ret[2]+' '+"%.
        2f" % ret[3]+' '+"%.2f" % ret[4]);
        print (" ");
    percentages[0]=percentages[0]+ret[1]/nmax;
    percentages[1]=percentages[1]+ret[2]/nmax;
    percentages[2]=percentages[2]+ret[3]/nmax;
    percentages[3]=percentages[3]+ret[4]/nmax;
    if m==mtn:
        correct=correct+1;
    elif m==−2 or m==−1:
        correct=correct+1;
    s1=s1+upd; f1=f1+upd;
    if output==2:
        print(file+' '+str(correct/(nmax)));
        print("%.2f" % percentages[0]+' '+"%.2f" % percentages
        [1]+' '+"%.2f" % percentages[2]+' '+"%.2f" %
percentages[3]);
    if correct/(nmax−1)>0.5:
        bolMot[0]=1;
    else:
        bolMot[0]=0;
    bolMot[1]=float(correct/(nmax));
    bolMot[2]=percentages[0]; bolMot[3]=percentages[1];
    bolMot[4]=percentages[2]; bolMot[5]=percentages[3];
    return bolMot;
Secondary Methods Utilized by the Main Motion Identification Method:
def peakdet(v, delta, x):
    """
    % PEAKDET Detect peaks in a vector
    % [MAXTAB, MINTAB]=PEAKDET(V, DELTA, X) finds the local maxima and
    % minima ("peaks") in the vector V.
    %
    % A point is considered a maximum peak if it has the maximal
    % value, and was preceded (to the left) by a value lower by
    % DELTA.
    % Eli Billauer, 3.4.05 (Explicitly not copyrighted).
    % This function is released to the public domain; Any use is allowed.
    """
    maxtab=[ ]
    mintab=[ ]
    if x is None:
        x=arange(len(v))
    v=asarray(v)
    if len(v) !=len(x):
        sys.exit('Input vectors v and x must have same length')
    if not isscalar(delta):
        sys.exit('Input argument delta must be a scalar')
    if delta<=0:
        sys.exit('Input argument delta must be positive')
    mn, mx=Inf, −Inf
    mnpos, mxpos=NaN, NaN
    lookformax=True
    for i in arange(len(v)):
        this=v[i]
        if this>mx:
            mx=this
            mxpos=x[i]
        if this<mn:
            mn=this
            mnpos=x[i]
        if lookformax:
            if this<mx-delta:
                maxtab.append((mxpos, mx))
                mn=this
                mnpos=x[i]
                lookformax=False
        else:
            if this>mn+delta:
                mintab.append((mnpos, mn))
                mx=this
                mxpos=x[i]
                lookformax=True
    return maxtab, mintab
def powermeans(X, W, r):
    """
```

Computes the mean using the formula
[(sum xr)/n](1/r).
A general function, use specific functions
for more accuracy, example, for r==1,
call the mean(X, method= . . . ). See previous blogs.
X—original data
W—optional weight array.
r—power (usually integer valued.)
"""
  n=len(X)
  if W is None:
    if r==−1: #harmonic mean
      return 1.0/(sum([(1.0/x) for x in X])/n)
    elif r==0: # geometric mean
      return exp(sum([(log(x) for x in X)])/n)
    elif r==1: # arithmetic mean.
      return sum(X)/float(n)
    elif r==2: # rms.
      return sqrt(sum([x*x for x in X])/n)
    else:
      return (sum([xr for x in X])/n)(1.0/r)
  else:
    if r==−1: #harmonic mean
      return 1.0/(sum([w*(1.0/x) for x,w in zip(X,W)])/sum(W))
    elif r==0: # geometric mean
      return exp(sum([w*(log(x) for (x,w) in zip(X,W))])/sum(W))
    elif r==1: # arithmetic mean.
      return sum(w*x for (x, w) in zip(X,W))/float(sum(W))
    elif r==2: # rms.
      return sqrt(sum([w*x*x for x,w in zip(X,W)])/sum(W))
    else:
      return (sum([w*xr for x,w in zip(X,W)])/n)(1.0/(sum(W)))
def nextpow2(i):
  n=2
  while n<i: n=n*2
  return n
def percentages (Mw, Mr, Mc, Mb):
  bottom=min(Mw, Mr, Mc, Mb)−1;
  MwU=Mw−bottom; MrU=Mr−bottom;
  McU=Mc−bottom; MbU=Mb−bottom;
  total=MwU+MrU+McU+MbU;
  return [MwU/total, MrU/total, McU/total, MbU/total,];
Implementation of the Main Motion Identification Method:
def findMotion(hZ, sXY, timeR):
Accepts vectors hZ containing vertical acceleration, sXY
containing horizontal acceleration and timer containing the
relative time stamp.
Returns a vector where the first entry is the identified motion
and the entries 2-5 are the counters of each of the motions
  n=len(hZ);
  Az=sum(hZ, 0.0)/n; As=sum(sXY, 0.0)/n;
  stdZ=sqrt(var(hZ)*len(hZ)/(len(hZ)−1));
  stdS=sqrt(var(sXY)*len(sXY)/(len(sXY)−1));
  #taking the FT
  Fs=n/timeR[−1];
  NFFT=nextpow2(n);
  zFT=fft(hZ−Az, NFFT)/n;
  xyFT=fft(sXY, NFFT)/n;
  f=Fs/2*linspace(0,1,NFFT/2+1);
  fZ=2*abs(zFT[0:NFFT/2+1]);
  fS=2*abs(xyFT[0:NFFT/2+1]);
  rmsZ=powermeans(fZ, None, 2); rmsS=powermeans(fS, None, 2);
  varZ4=sum([x**4 for x in hZ])/n;
  varZ3=sum([(x−Az)**3 for x in hZ])/n;
  rmsNet=sqrt(sum([z2+s2 for z,s in zip(hZ,sXY)])/n);
  var03=sum([x**3 for x in sXY])/n;
  var04=sum([(x−As)**3 for x in sXY])/n;
  peaksZ, mins=peakdet(fZ, max([0.033, 2*average(fZ)]), f)
  highFreqZ=average(fZ[n/4:]);
  if len(peaksZ)==0:
    peaksZ=[0, 0];
    tallZ=sort(peaksZ);
  elif len(peaksZ)==1:
    tallZ=[peaksZ[0][0], peaksZ[0][1]];
  else:
    tallZ=sorted(peaksZ, key=lambda k: k[1], reverse=True)
  if Az<−0.9 and stdZ<0.015 and stdS<0.015 and abs(As)<0.01:
    return [−1, 0, 0, 0, 0];
  elif stdZ<0.02 and stdS<0.015 and abs(1−Az)<0.05 and abs(As)<0.05:
    return [−2, 0, 0, 0, 0];
  elif Az<0.62 and stdZ>0.5:
    return [2, 0, 1, 0, 0];
  elif Az>0.6:
    Mw=0; Mr=0; Mc=0; Mb=0;
    if var03>0.05:
      Mc=Mc−1;
    if var04>0.056:
      Mw=Mw+1; Mr=Mr+1;
      Mc=Mc−2;
    if varZ3>0.005:
      Mc=Mc−1;
    if average(fZ)<1.2*highFreqZ:
      Mb=Mb+3; Mc=Mc+4;
      Mw=Mw−2; Mr=Mr−2;
    #if there are high frequencies, the motion favours car or bike
    elif average(fZ)<1.25*highFreqZ:
      Mb=Mb+3; Mc=Mc+3;
      Mw=Mw−1; Mr=Mr−1;
    elif average(fZ)<1.56*highFreqZ:
      Mb=Mb+2; Mc=Mc+2;
      Mw=Mw−1; Mr=Mr−1;
    elif average(fZ)<1.93*highFreqZ:
      Mb=Mb+2; Mc=Mc+1;
    elif average(fZ)<2.2*highFreqZ:
      Mb=Mb+1;
    elif average(fZ)<2.5*highFreqZ:
      Mb=Mb+1;
      Mw=Mw+1; Mr=Mr+1;
    else:
      Mw=Mw+1; Mr=Mr+1;
      Mc=Mc−1;
    #favour running for low ave, high std and high amplitude
    if len(peaksZ)==1:
      if Az<0.8 and Az>−0.8 and stdZ>0.69 and tallZ[1]>0.3:
        return [2, 0, 1, 0, 0];
    elif Az<0.8 and Az>−0.8 and stdZ>0.69 and tallZ[0][1]>0.3:
      return [2, 0, 1, 0, 0];

```
if rmsNet>1.44:
    Mr=Mr+2; Mc=Mc-3;
    Mb=Mb-1; Mw=Mw+1;
    elif rmsNet>1.4:
        Mb=Mb-1; Mc=Mc-2;
        Mw=Mw+1; Mr=Mr+1;
    elif rmsNet>1.16:
        Mw=Mw+1; Mr=Mr+1; Mc=Mc-1;
    elif rmsNet>1.11:
        Mc=Mc-1;
if stdS>0.52:
    Mr=Mr+2;
    Mc=Mc-1;
    Mb=Mb-1;
    if stdZ>0.62:
        Mr=Mr+2; Mc=Mc-3;
if Az<0.82:
    Mc=Mc-2;
#check for 4th power variance
if varZ4<1.09375:
    Mb=Mb+2;
    Mc=Mc+2;
    Mw=Mw-1;
elif varZ4<1.246:
    Mb=Mb+1; Mc=Mc+1;
elif varZ4>1.6953:
    Mw=Mw+1;
elif varZ4>2.0:
    Mw=Mw+2; Mb=Mb-1; Mc=Mc-1; Mr=Mr+1;
#Low deviation favours car
if max(fZ)<0.1 and As<0.2 and stdZ<0.1 and stdS<0.1:
    Mc=Mc+5;
elif max(fZ)<0.1 and As<0.2 and stdZ<0.2 and stdS<0.2:
    Mc=Mc+2;
    Mw=Mw-2; Mr=Mr-10;
#high frequency peak for idling car
if ndim(tallZ)==1 and tallZ[0]>20:
    return [3, 0, 0, 1, 0];
elif ndim(tallZ)>1 and tallZ[0][0]>20:
    return [3, 0, 0, 1, 0];
#biking tends to have lower rms than walking
if rmsZ<0.007:
    Mc=Mc+1;
elif rmsZ<0.026:
    Mb=Mb+1;
elif rmsZ>0.098:
    Mw=Mw+2; Mr=Mr+2;
    Mc-=2; Mb-=1;
elif rmsZ>0.069: #0.051 0.0718
    Mw=Mw+1; Mr=Mr+1;
#one peak much taller than the other
if ndim(tallZ)>1 and (tallZ[0][1])>(5.2*(tallZ[1][1])):
    Mb=Mb+2;
elif ndim(tallZ)>1 and (tallZ[0][1])>1.33*(tallZ[1][1]):
    Mb=Mb+1;
elif ndim(tallZ)==1 and (tallZ[1])>2.0*average(fZ):
    Mb=Mb+2;
    if tallZ[1]==0 or tallZ[1]<0.15:
        Mc=Mc+2;
#if FT ammplitude is too low, disfavour running
if ndim(tallZ)==1 and tallZ[1]<0.2:
    Mr=Mr-1;
elif ndim(tallZ)>1 and tallZ[0][1]<0.2:
    Mr=Mr-1;
#if no peaks, disfavour walk/run, use [0] instead [0 0] for
    1D
if ndim(tallZ)==1 and tallZ[0]==0:
    Mw=Mw-1; Mr=Mr-1;
#favour walking if the dominant peak is at a low frequency
if max(fZ)>7.9*average(fZ): #3.85
    if ndim(tallZ)==1 and tallZ[0]<2.6: #2.6
        Mw=Mw+1;
    elif ndim(tallZ)>1 and tallZ[0][0]<2.6:
        Mw=Mw+1;
#if highest peak is at a high frequency less likely to be
    walking
if ndim(tallZ)==1:
    if tallZ[0]>2.24 and tallZ[1]<0.3:
        Mw=Mw-1; Mc=Mc+1; Mb=Mb+2;
elif ndim(tallZ)>1:
    if tallZ[0][0]>2.24 and tallZ[0][1]<0.3:
        Mw=Mw-1; Mc=Mc+1; Mb=Mb+2;
if ndim(tallZ)==1 and tallZ[0]>2 and tallZ[1]<0.16:
    Mb=Mb+1; Mc+=1;
elif ndim(tallZ)>1 and tallZ[0][0]>2 and tallZ[0][1]<0.16:
    Mb=Mb+1; Mc+=1;
elif ndim(tallZ)>1 and tallZ[0][1]<0.1:
    Mb=Mb+1; Mc+=1;
if ndim(tallZ)==1 and tallZ[1]<0.1:
    Mb=Mb+1; Mc+=1;
percent=percentages(Mw, Mr, Mc, Mb);
#find maximum value
if Mw>=Mr and Mw>=Mc and Mw>=Mb:
    return [1, percent[0], percent[1], percent[2], percent
        [3]];
elif Mr>=Mw and Mr>=Mc and Mr>=Mb:
    return [2, percent[0], percent[1], percent[2], percent
        [3]];
elif Mc>=Mw and Mc>=Mr and Mc>Mb:
    return [3, percent[0], percent[1], percent[2], percent
        [3]];
elif Mb>=Mw and Mb>=Mr and Mb>=Mc:
    return [4, percent[0], percent[1], percent[2], percent
        [3]];
else:
    return [0, percent[0], percent[1], percent[2], percent
        [3]];
else:
return [0, 0, 0, 0, 0];
```

The invention claimed is:

1. A method, comprising:

receiving a time value and three streams of data sample values from an accelerometer of a wireless communication device (WCD) that is transported by a mobile thing (MT), each data sample value indicative of an acceleration of the WCD along an axis of a three dimensional (3D) coordinate system at a corresponding time value;

recognizing a particular set of data sample values as a reference in the 3D coordinate system for defining a relationship between an orientation of the WCD and a two dimensional (2D) coordinate system;

computing reference data based upon the recognition of the particular set, the reference data defining a relationship between each set of subsequent non-reference data sample values and the particular reference set of data sample values in the 2D coordinate system;

calculating movement data in the 2D coordinate system of one or more other non-reference data sample values based upon the reference data; and determining a moving thing motion activity (MTMA) associated with the MT based upon the movement data.

2. The method of claim 1, further comprising:

prior to recognizing, mathematically combining the data sample values of the particular reference set; and recognizing the particular reference set as the reference when a combined value has a magnitude that is indicative of a relationship to Earth gravity.

3. The method of claim 2, further comprising updating the reference data each time the reference set of data samples is recognized.

4. The method of claim 1, wherein:
each set of data sample values includes a vector defined by three data sample values x,y,z;
the reference data is a rotation matrix M; and
the movement data comprises a vertical magnitude along the z axis and a horizontal magnitude along the x, y plane, both derived from a rotated vector, the rotated vector equal to the rotation matrix M multiplied by the vector associated with the other non-reference data sample values x,y,z.

5. The method of claim 4, further comprising:
transforming the movement data to the frequency domain (FD) to produce FD data;
computing one or more FD statistical metrics from the FD data; and
wherein the MTMA identifying is based at least in part upon the FD statistical metrics.

6. The method of claim 5, wherein the MTMA is identified from a set of MTMAs and further comprising:
computing a score for each MTMA of the set; and
comparing the scores to identify the MTMA.

7. The method of claim 1, wherein the MTMA is identified from a set of MTMAs and further comprising:
computing a score for each MTMA of the set; and
comparing the scores to identify the MTMA.

8. The method of claim 1, wherein the reference data is in the form of a rotation matrix that normalizes the sets of non-reference data sample values with respect to Earth gravity.

9. The method of claim 1, wherein the movement data is in the time domain (TD) and wherein the computing comprises:
computing a magnitude of the movement data in each of the two dimensions of space;
computing one or more TD statistical metrics from the magnitudes; and
wherein the MTMA determining is based at least in part upon the TD statistical metrics.

10. The method of claim 9, further comprising:
transforming the magnitudes from the TD to the frequency domain (FD) to produce FD data;
computing one or more FD statistical metrics from the FD data; and
wherein the MTMA determining is based at least in part the FD statistical metrics.

11. The method of claim 1, wherein one or more of the steps of the method is implemented in the WCD.

12. A method, comprising:
receiving first and second data from an accelerometer associated with a wireless communication device (WCD) transported by a mobile thing (MT), the first and second data indicative of acceleration of the WCD;
determining reference data that defines a reference framework in two dimensions (2D) of space from the first data;
normalizing the second data with the reference data so that the second data can be analyzed in the 2D space; and
identifying a mobile thing motion activity (MTMA) associated with the MT based upon the normalized second data.

13. The method of claim 12, wherein the second data comprises a plurality of periodic samples.

14. The method of claim 12, wherein the reference data is indicative of a relationship to Earth gravity.

15. The method of claim 12, wherein the reference data is determined in the form of vector information indicative of a relation to Earth gravity by comparing the first data to a predefined numerical range.

16. The method of claim 15, wherein the accelerometer produces first, second, and third sample data along each of 3 axes in a three dimensional (3D) coordinate system and wherein the first data pertains to a value that equals one within a predefined range, the value computed by combining the first, second, and third sample data.

17. The method of claim 12, wherein the second data is in the time domain (TD) and wherein the identifying comprises:
computing magnitudes of the second data in each of the two dimensions of the 2D space;
computing one or more TD statistical metrics from the magnitudes; and
wherein the MTMA identifying is based at least in part upon the TD statistical metrics.

18. The method of claim 17, further comprising:
transforming the magnitudes from the TD to the frequency domain (FD) to produce FD data;
computing one or more FD statistical metrics from the FD data; and
wherein the MTMA identifying is based at least in part the FD statistical metrics.

19. The method of claim 18, wherein the MTMA is identified from a known plurality of MTMAs and further comprising:
computing a score for each MTMA of the known plurality; and
comparing the scores to identify the MTMA.

20. The method of claim 12, wherein one or more of the steps of the method is implemented in the WCD.

21. The method of claim 12, further comprising:
determining an MTMA based action to be initiated based upon the identified MTMA; and
initiating an MTMA based action.

22. A method, comprising:
receiving a time value and three streams of data sample values from an accelerometer of a wireless communication device (WCD) that is transported by a mobile thing (MT), each data sample value indicative of an acceleration of the WCD along an axis of a three dimensional (3D) coordinate system at a corresponding time value;
computing reference data, the reference data defining a relationship between data sample values and a reference framework to enable comparison of 3D sets of data sample values;
calculating movement data for each set based upon the reference data; and
determining a moving thing motion activity (MTMA) associated with the MT based upon the movement data.

23. The method of claim 22, further comprising:
recognizing a particular set of data sample values as a reference in the 3D coordinate system for defining a relationship between an orientation of the WCD and a two dimensional 2D coordinate system;
determining a rotation matrix based upon the particular set of reference data sample values; and
calculating the movement data based upon the rotation matrix and one or more sets of the data sample values that are not the particular reference set.

* * * * *

UNITED STATES PATENT AND TRADEMARK OFFICE
CERTIFICATE OF CORRECTION

| | | |
|---|---|---|
| PATENT NO. | : 8,452,273 B1 | |
| APPLICATION NO. | : 13/658353 | |
| DATED | : May 28, 2013 | |
| INVENTOR(S) | : Khomenko et al. | |

It is certified that error appears in the above-identified patent and that said Letters Patent is hereby corrected as shown below:

In the Specification

Column 1, line 10, after "Aug. 30", please delete "3013" and insert --2012--.

Column 1, line 15, after "Aug. 30", please delete "3013" and insert --2012--.

Column 24, line 16, after "having", please insert --application no.--.

Column 24, line 17, after "on", delete "even date herewith" and insert --August 30, 2012--.

Column 24, line 19, after "having", please insert --application no.--.

Column 24, line 19, after "on", delete "even date herewith" and insert --August 30, 2012--.

Signed and Sealed this
Eleventh Day of February, 2014

Michelle K. Lee
*Deputy Director of the United States Patent and Trademark Office*